US012801758B2

(12) United States Patent
Agarwal et al.

(10) Patent No.: US 12,801,758 B2
(45) Date of Patent: Nov. 17, 2026

(54) IDENTIFYING CYBERSECURITY RISKS USING GRAPH EXPANSION AND FLUENTS

(71) Applicant: Averlon, Inc., Redmond, WA (US)

(72) Inventors: Vishal Agarwal, Woodinville, WA (US); Pavel Surynek, Prague (CZ); Sunil P. Gottumukkala, Redmond, WA (US); Satish Kumar Thittamaranahalli, Los Angeles, CA (US)

(73) Assignee: Averlon, Inc., Redmond, WA (US)

( * ) Notice: Subject to any disclaimer, the term of this patent is extended or adjusted under 35 U.S.C. 154(b) by 15 days.

(21) Appl. No.: 18/945,771

(22) Filed: Nov. 13, 2024

(65) Prior Publication Data

US 2026/0134108 A1 May 14, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 8,200,594 | B1 * | 6/2012 | Bleiweiss | A63F 13/67 706/45 |
| 9,292,695 | B1 * | 3/2016 | Bassett | G06F 21/577 |
| 11,842,430 | B2 * | 12/2023 | Peterson | G06T 7/11 |
| 2025/0131098 | A1 * | 4/2025 | Neupane | G06F 21/577 |

OTHER PUBLICATIONS

Mitre, ATT&CK, ATT&CK Matrix for Enterprise, <https://attack.mitre.org/> Retrieved from Internet Nov. 12, 2024, 2 pages.

* cited by examiner

*Primary Examiner* — Ayoub Alata
(74) *Attorney, Agent, or Firm* — Young Basile Hanlon & MacFarlane, P.C.

(57) ABSTRACT

A cybersecurity risk identification software (CRIS) identifies cybersecurity risks in an information technology (IT) infrastructure. The CRIS receives fluents representing relationships between components within the IT infrastructure, the components including compute nodes and roles. The CRIS constructs a directed graph from the fluents, where the directed graph represents potential attack paths through the IT infrastructure. The CRIS traverses the directed graph to identify a presence of at least one path from an entry node to an exit node, the at least one path corresponding to a cybersecurity risk. The CRIS assigns costs to edges within the directed graph. The CRIS identifies edges to sever attack paths based on the assigned costs.

20 Claims, 15 Drawing Sheets

IDENTIFYING CYBERSECURITY RISKS USING GRAPH EXPANSION AND FLUENTS

TECHNICAL FIELD

This disclosure relates generally to cybersecurity and more specifically to identifying cybersecurity risks using graph expansion and fluents.

BACKGROUND

In the realm of cybersecurity, protecting information technology (IT) infrastructures from unauthorized access, data breaches, and vulnerability exploitation is paramount. As businesses adopt increasingly complex and interconnected systems, the risk of exposure to malicious actors grows significantly. Protecting these systems involves addressing various factors, including identifying vulnerabilities, managing access controls, monitoring network activities, and ensuring the resilience of critical infrastructures. These factors play critical roles in safeguarding against a wide range of threats and adversarial behaviors. A fundamental challenge in cybersecurity is understanding how attackers can exploit weaknesses through the various phases of an attack, such as gaining initial access, moving laterally across the network, escalating privileges to compromise critical systems, and ultimately exfiltrating sensitive data.

SUMMARY

Disclosed herein are implementations of identifying cybersecurity risks using graph expansion and fluents.

One general aspect includes a method implemented by a cybersecurity risk identification software for identifying cybersecurity risks in an information technology (it) infrastructure. The method also includes receiving fluents representing relationships between components within the it infrastructure, the components including compute nodes and roles. The method also includes constructing a directed graph from the fluents, where the directed graph represents potential attack paths through the it infrastructure. The method also includes traversing the directed graph to identify a presence of at least one path from an entry node to an exit node, the at least one path corresponding to a cybersecurity risk. The method also includes assigning costs to edges within the directed graph. The method also includes identifying edges to sever attack paths based on the assigned costs.

One general aspect includes a device for identifying cybersecurity risks in an information technology (it) infrastructure. The device also includes a memory subsystem. The device also includes processing circuitry. The processing circuitry configured to execute instructions stored in the memory subsystem to: receive fluents representing relationships between components within the it infrastructure, the components including compute nodes and roles; construct a directed graph from the fluents, where the directed graph represents potential attack paths through the it infrastructure; traverse the directed graph to identify a presence of at least one path from an entry node to an exit node, the at least one path corresponding to a cybersecurity risk; assign costs to edges within the directed graph; and identify edges to sever attack paths based on the assigned costs.

One general aspect includes non-transitory computer readable media storing instructions operable to cause processing circuitry of a device to identify cybersecurity risks in an information technology (it) infrastructure by operations that include receiving fluents representing relationships between components within the it infrastructure, the components including compute nodes and roles; constructing a directed graph from the fluents, where the directed graph represents potential attack paths through the it infrastructure; traversing the directed graph to identify a presence of at least one path from an entry node to an exit node, the at least one path corresponding to a cybersecurity risk; assigning costs to edges within the directed graph; and identifying edges to sever attack paths based on the assigned costs.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
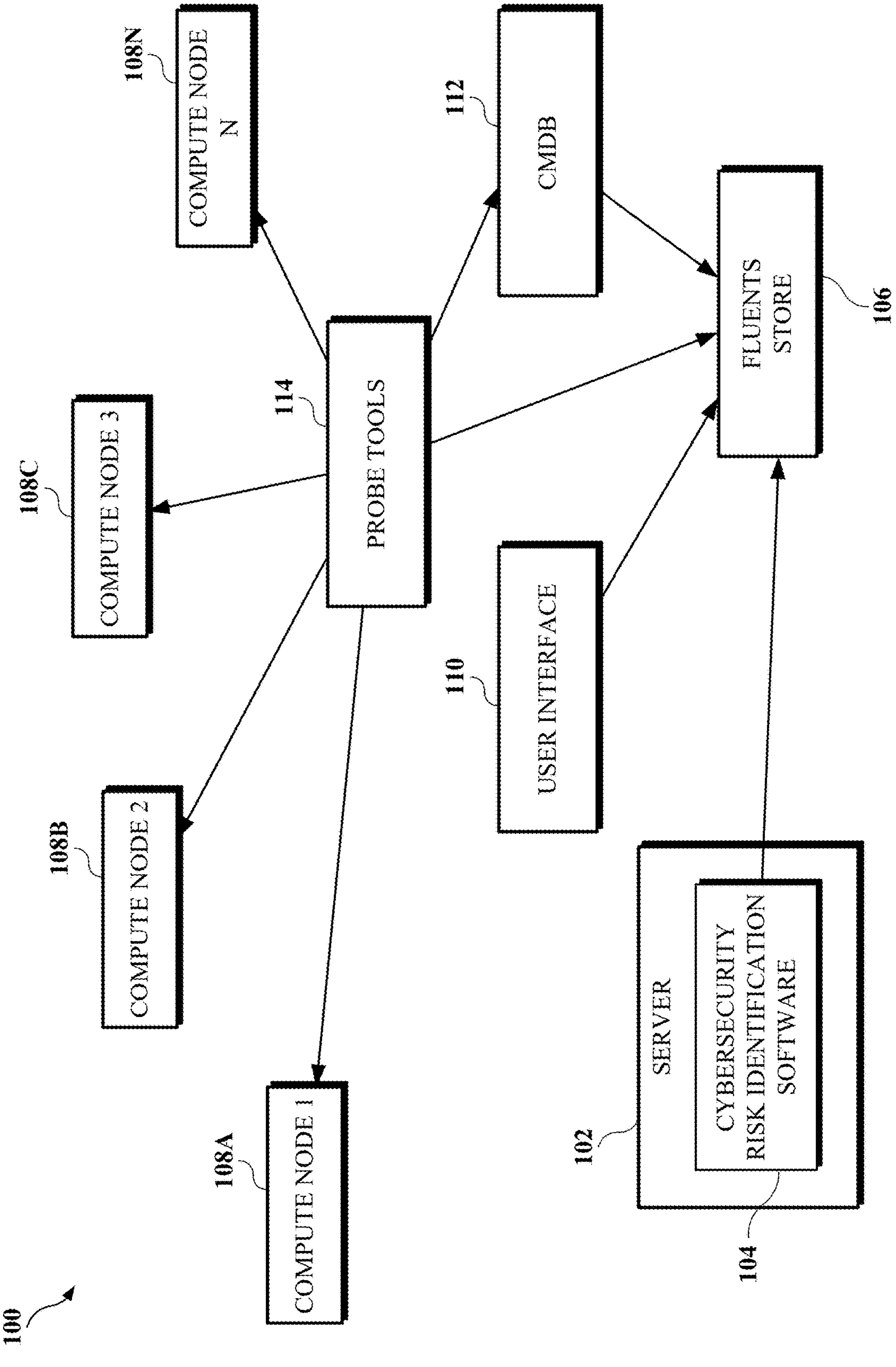
FIG. 1 is a block diagram of a system for identifying cybersecurity risks.

Adversaries-whether state-sponsored groups, organized cybercriminals, or individual hackers employ a wide array of tactics, techniques, and procedures (TTPs) to compromise systems, steal sensitive data, disrupt services, or inflict damage on businesses. These adversaries exploit weaknesses within an organization's IT infrastructure, which may consist of hundreds, if not thousands, of interconnected compute nodes, services, and access points. Each component represents a potential entry point or vector for attack, and adversaries often combine multiple techniques to bypass security measures and achieve their goals.

Identifying cybersecurity risks is critical to mitigating the damage caused by such attacks. A cybersecurity risk refers to any potential threat that could exploit a vulnerability and compromise the confidentiality, integrity, or availability of a system. Most of the challenges in identifying cybersecurity risks stem from the complex interactions between software vulnerabilities and/or misconfigurations, network reachability, and resource access privileges within an IT environment.

A crucial tool for risk identification is the modeling of attack chains, which represent the sequence of steps or phases that an adversary follows to achieve their objectives. An example of an attack chain may consist of phases like Initial Access (IA), Lateral Movement (LM), Collection (CO), and Exfiltration (EX), each describing a distinct action in the attacker's process. By identifying and modeling these attack chains, organizations can anticipate potential attack paths, prioritize vulnerabilities, and develop proactive defenses.

Conventional approaches to identifying cybersecurity risks often rely on static analysis, rule-based engines, or predefined attack signatures. While these methods are effective in recognizing known vulnerabilities or common attack patterns, they struggle with the combinatorial nature of cybersecurity risks. As an IT infrastructure grows in complexity, the number of potential attack chains increases exponentially. Each node in the network can be targeted in various ways, and the interactions between vulnerabilities, network configurations, and access permissions create a vast space of possible attack vectors. Traditional tools are often unable to model these interactions comprehensively, leaving organizations exposed to new and evolving threats that do not match predefined signatures.

Implementations according to this disclosure use a cybersecurity risk identification software (CRIS) to identify cybersecurity risks by transforming the problem into a graph traversal problem. A database of fluents (e.g., facts and relationships) about an IT infrastructure is converted into an expanded directed graph. Cybersecurity risks exist in the IT infrastructure if there is at least one path from an entry node to an exit node in the directed graph. Generating the directed graph is essentially equivalent to generating a set of possible cybersecurity risks using a combinatorial space that is represented in a compact way (i.e., as a graph). Costs are associated with the edges of the directed graph, representing the likelihood or ease for an attacker to traverse from one node to another. Factors such as the discoverability of a node and the tools or payload available to the attacker affect the cost. These costs help prioritize which edges should be removed or mitigated to break attack chains (e.g., eliminate risks), focusing on the least costly edges for the customer to address effectively. As such any known graph traversal techniques can be used to identify cybersecurity risks and any min-cut techniques can be used to identify which edge (and, consequently, fluents) should be severed to mitigate the risks.

Fluents can be thought of as relations over various objects (e.g., a compute node or a role) that arise in the security reasoning context. There can be unary, binary, and n-ary fluents, defined over compute nodes and roles. The fluents can define properties, permissions etc. of compute nodes and roles. A compute node can be a server, a firewall device, a router, a personal device, a desktop, or any such similar device. Hence compute nodes form a network. A role (e.g., a specific access right) can define and restrict activities an actor/attacker can perform within the security environment. Another (e.g., a second) role can be assumed from a given (e.g., a first) role. As such, a network of roles can be defined over the set of roles.

To provide but a few examples, if a compute node $cn_2$ is reachable (e.g., there is a network path) from another compute node $cn_1$, then the database of fluents would include the binary fluent CAN_REACH($cn_1$, $cn_2$); if the compute node $cn_1$ is reachable from the internet (such as because, for example, port 80 on the compute node $cn_1$ is open and placed outside of an organization's firewall), then the database would include the unary fluent IS_REACHABLE_FROM_INTERNET($cn_1$); if the access right $r_1$ is available in a given compute node $cn_1$, then the database would include the binary fluent HAS_ROLE($cn_1$, $r_1$); and if a first role $r_1$ can assume a second role $r_2$, then the database would include the binary fluent CAN_ASSUME($r_1$, $r_2$).

It is noted that the terminology (e.g., phases and techniques) of the MITRE ATT&CK® framework is primarily referenced herein to describe attack phases and techniques. However, the disclosure is not limited to any one framework. Other frameworks, such as the Cyber Kill Chain, Diamond Model of Intrusion Analysis, NIST Cybersecurity Framework, and others may also be used, provided that the CRIS is supplied with a mapping from the phases or techniques of the chosen framework into fluents. The flexibility of the CRIS allows it to incorporate and operate with any cybersecurity framework as long as the relevant attack vectors, phases, or tactics can be expressed through fluents and their corresponding relationships.

To describe some implementations in greater detail, reference is first made to examples of systems, machines, implements, hardware, and software structures used to implement a system for identifying cybersecurity risks.

FIG. 1 is a block diagram of a system 100 for identifying cybersecurity risks. The system 100 includes a server 102 which implements a CRIS 104. The CRIS 104 analyzes cybersecurity risks by leveraging fluents stored in a fluents store 106. As mentioned, fluents represent n-ary relationships or properties (e.g., unary or binary) between components within an IT environment. These components may include hundreds to thousands of devices, such as compute nodes 108A, 108B, 108C, . . . , 108N. Each of these compute nodes can play a role in the security environment by serving as an entry point, intermediary, or target for adversarial actions. For example, the compute node 108A may be a web server hosting web applications, the compute node 108B may be a database server containing sensitive customer data, the compute node 108C might be a virtual machine used for software development, and the compute node 108N could be a cloud-based storage instance or virtual machine.

The fluents store 106 contains data (i.e., fluents) reflecting relationships between the components of the IT environment, such as whether one node is reachable from another or whether certain access rights are associated with a node. The fluents can also include role information, such as whether one role can assume another role. The sets of fluents describing the IT environment is referred herein as a set of fluents or a fluents database.

Examples include the unary fluent IS_REACHABLE_FROM_INTERNET(cn1), indicating that a node is exposed to the internet; the binary fluent CAN_REACH (cn1, cn2), representing connectivity from the node cn1 to the node cn2; the binary fluent HAS_ROLE(cn1, r1), signifying that a specific access right is available on a node; and the binary fluent CAN_ASSUME(r1, r2), signifying that a person/device/application having a role r1 is capable of assuming the role r2. These fluents allow the CRIS 104 to analyze potential attack chains and vulnerabilities within the infrastructure.

At least some fluents can be manually entered through a user interface 110, where administrators provide or modify data about the IT environment. This interface could take the form of dashboards or input forms where network configurations, permissions, and known vulnerabilities are specified by security professionals. Additional fluents may be generated from a configuration management database (CMDB) 112, which stores configuration data about the compute nodes. Such data may include information about the network topology, installed software versions, firewall configurations, and access control lists. For example, if the CMDB 112 indicates that compute node 108A has ports 80 and 443 open, the system may generate the fluent IS_REACHABLE_FROM_INTERNET(108A). Similarly, if the CMDB 112 identifies that a specific user group has administrator privileges on compute node 108B, this information could be translated into the fluent HAS_ROLE(108B, ADMIN).

Probe tools 114 further support the system 100 by collecting real-time data from various devices within the infrastructure. The probe tools 114 may probe nodes to determine which ports are open, assess whether a node is reachable from the internet, conduct network connectivity tests to confirm communication between nodes, and other tasks related to discovering facts and properties about the IT environment. For example, a probe tool might determine that a node is reachable from the internet by identifying an open port, such as port 80 or 443, or verify that one node can access another through internal network paths. Service scans could also be performed to detect running services on the nodes, helping to identify points of entry for potential attacks.

The IT environment can be modeled as both a compute node graph and a role graph. The compute node graph represents the connections and relationships between nodes in the IT environment, capturing how data and control flow between servers, virtual machines, and other devices. For example, an edge in the compute node graph may indicate that one node can reach another over a network path, as represented by the fluent CAN_REACH(cn1, cn2). The role graph, on the other hand, captures relationships between user roles and permissions. The role graph models which roles can assume other roles or access particular resources. For instance, if role r1 can escalate privileges to role r2, the system 100 represents this using the fluent CAN_ASSUME (r1, r2).

In operation, the system 100 relies on data from the user interface 110, the probe tools 114, and/or the CMDB 112 to populate the fluents store 106 with the necessary information about the IT environment. The CRIS 104 retrieves these fluents from the fluents store 106 and uses them to analyze and identify cybersecurity risks, including potential attack chains. By converting these relationships (i.e., the fluents) into a directed graph as described herein, the CRIS 104 assesses the IT environment for vulnerabilities and recommends actions to mitigate identified risks. More specifically, given an attack chain and a mapping of fluents to partial attack chains, the CRIS 104 converts the fluents into a directed graph. A path through the directed graph indicates that the attack chain can be fulfilled in the IT environment.

The fulfillment of an attack chain requires identifying a path across the compute node graph and/or the role graph, with permissions verified along the way. The question "Can a specific attack chain be fulfilled in a given fluent database?" defines a combinatorial search space. This search space involves traversing the compute node graph and role graph, while also checking for required permissions at each step. Pathfinding is essential to determine if an attacker can successfully progress through a series of nodes and roles.

Figure 2:
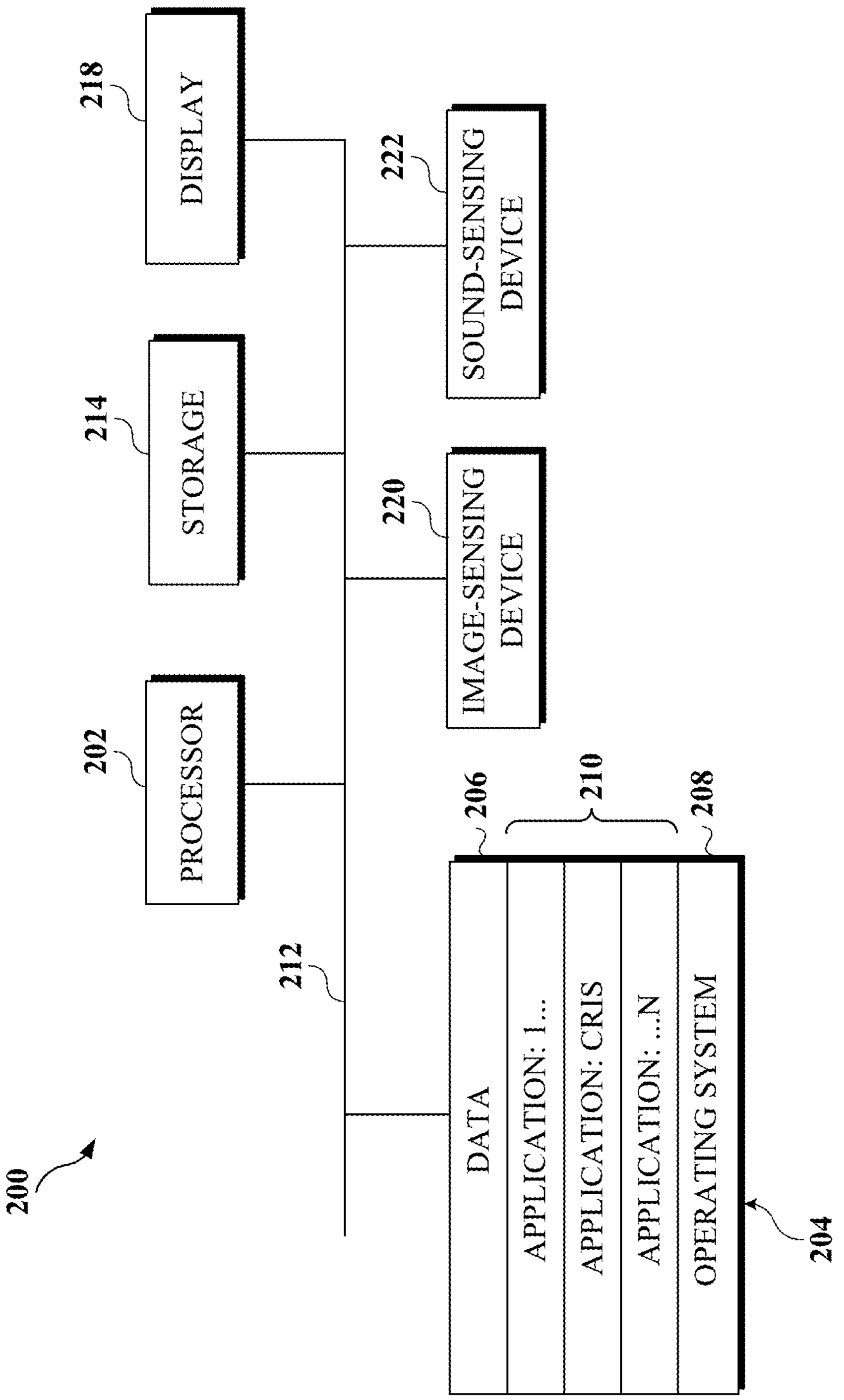
FIG. 2 is a block diagram of a computing device.

FIG. 2 is a block diagram of a computing device 200. The computing device 200 can implement a server, such as server 102 of FIG. 1. The computing device 200 can be implemented as a computing system comprising one or more devices, such as an embedded system or server, suitable for industrial or agricultural environments.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in the computing device 200 can include different types of memory, such as random access memory (RAM) for temporary data storage during processing, and read-only memory (ROM) for storing firmware or other static information. Additionally, the memory 204 can store code and data 206 accessed by the processor 202 via a bus 212. The memory 204 also includes an operating system 208 and application programs 210, including at least one CRIS program enabling the processor 202 to perform cybersecurity risk identification. For example, when the computing device 200 implements the server 102 of FIG. 1, the application programs 210 may include applications 1 through N, which further include substate prediction software that executes the relevant techniques.

The computing device 200 can also include secondary storage 214 for non-volatile storage, which may be used to store larger datasets or historical telemetry information. This secondary storage may comprise memory cards, solid-state drives (SSDs), or other forms of persistent storage suitable for storing data that needs to be accessed as required by the processor 202.

The computing device 200 can include output devices such as a display 218. The display 218 can be a touch-sensitive display that allows user interaction and can be implemented using conventional technologies, such as LCD or OLED. Other output devices, such as indicator lights or audible alarms, may also be used to communicate status or alerts.

The computing device 200 can include or communicate with an image-sensing device 220, such as a camera, capable of capturing images relevant to machine operations. For example, an image-sensing device mounted on a machine may capture images of the field, crops, or operational components, which can be analyzed for features that serve as inputs to an ML model for substate prediction. The computing device 200 can also include or be in communication with a sound-sensing device 222, such as a microphone. The sound-sensing device can capture operational sounds, such as engine noise or alarm signals, which may be analyzed to determine machine conditions, identify faults, or trigger maintenance actions.

Although FIG. 2 depicts the processor 202 and the memory 204 of the computing device 200 as being integrated into one unit, other configurations can be utilized. The operations of the processor 202 can be distributed across multiple devices (wherein individual device can have one or more processors) that can be coupled directly or across a local area or other network. The memory 204 can be distributed across multiple devices such as a network-based memory or memory in multiple devices performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
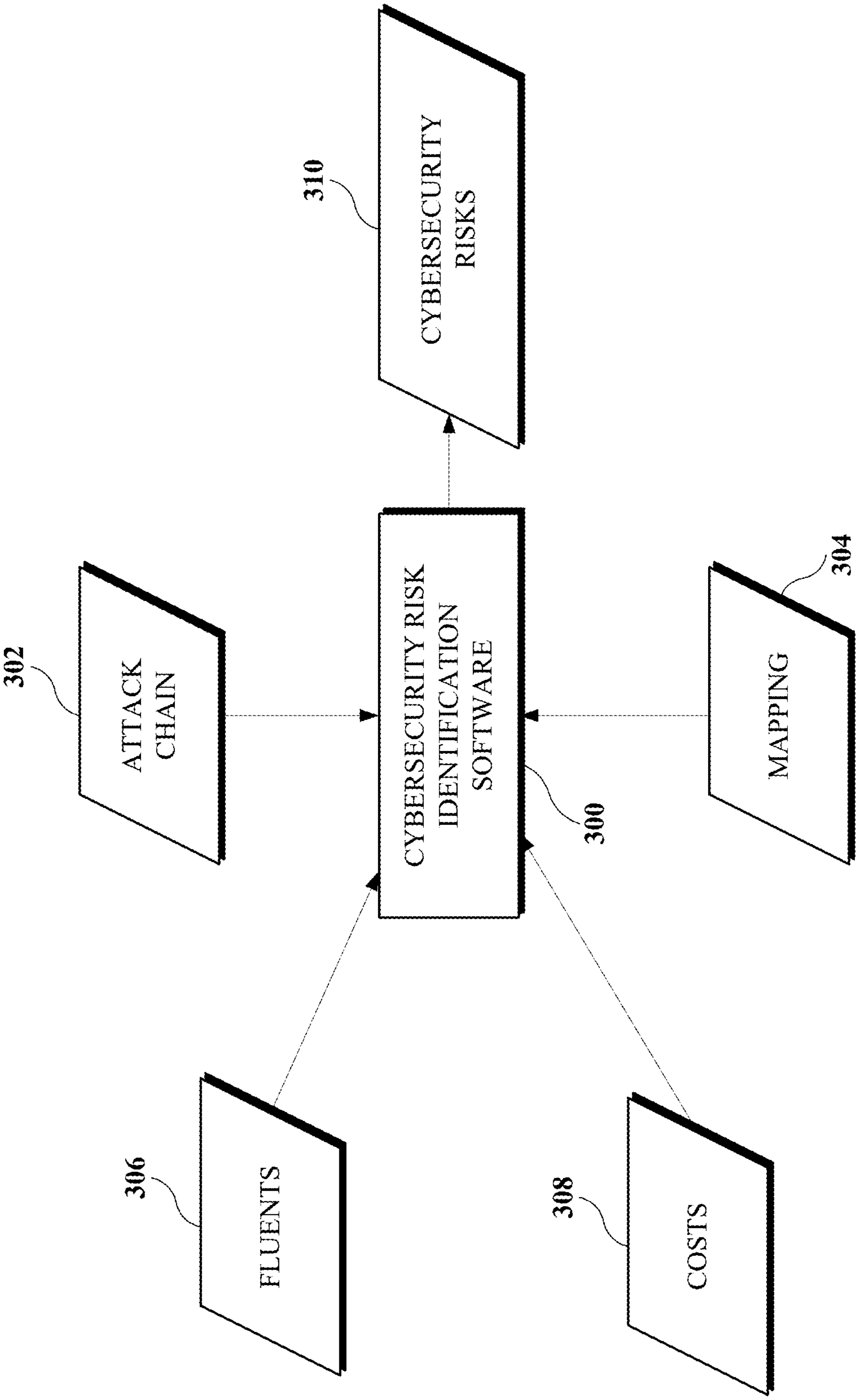
FIG. 3 illustrates a high level example of how cybersecurity risk identification software converts an attack chain into a directed graph using fluents to determine whether the fluents fulfil the attack chain.

FIG. 3 illustrates a high level example of how the CRIS 300 converts an attack chain into a directed graph using fluents to determine whether the fluents fulfil the attack chain. The CRIS 300 can be the CRIS 104 of FIG. 1. The CRIS 300 can be implemented by a computing device, such as the computing device 200 of FIG. 2.

An attack chain consists of typical phases that enable defining partial attack chains. The attack chains may be, at least in part, industrially recognized, such as by the MITRE ATT&CK® framework. Partial attack chains of multiple types may be distinguished. The CRIS 300 may, for example, recognize (e.g., define expansions for) the following partial attack chain types, amongst others: Initial Access, Collection, Exfiltration, Lateral Movement, and Privilege Escalation. Each of the phases (i.e., partial attack chains) may be accomplished via many techniques. To illustrate, the Initial Access partial attack chain may be accomplished via techniques including content injection, drive-by compromise, phishing, default accounts, and many others, as described by the MITRE ATT&CK® framework.

The Initial Access partial attack chain corresponds to a phase in which the attacker gains access to the security environment. The Collection partial attack chain corresponds to a phase in which the attacker collects various permissions from one or multiple computational resources. The Exfiltration partial attach chain corresponds to a phase in which the attacker uses the collected permissions and the access to computational resources for carrying out malicious action. The Lateral Movement partial attack chain corresponds to a phase in which the attacker moves within the security environment among various computational resources. The Privilege Escalation partial attack chain corresponds to a phase in which the attacker substantially increases its privileges to a dangerous level.

The CRIS 300 receives an attack chain 302 and a mapping 304 of fluents to attack chains. The mapping 304 defines how fluents correspond to specific stages or elements of the attack chain, allowing the system to identify conditions under which the attack chain is fulfilled. The fluents 306 (e.g., database or set of fluents), which may be stored in the fluents store 106 of FIG. 1, are used by the CRIS 300 to construct a directed graph representing the attack chain's fulfillment. The CRIS 300 then traverses this directed graph using known graph traversal techniques to determine whether a valid path exists from a starting node to a target resource.

Graph traversal techniques that can be used by the CRIS 300 include, but are not limited to, the following well-known algorithms. Breadth-First Search (BFS) explores all neighbors of a node before moving to the next level, making it particularly useful for finding the shortest path in terms of the number of steps. Depth-First Search (DFS), on the other hand, explores as far down a branch as possible before backtracking, which is effective for detecting cycles or traversing complex paths. Dijkstra's Algorithm is a weighted graph traversal method that identifies the shortest path based on edge weights, making it ideal when costs are associated with traversal. A Search Algorithm* further enhances traversal by using heuristics to prioritize nodes, improving efficiency, especially in large graphs.

If the traversal reveals a path in the directed graph, this indicates the presence of a cybersecurity risk 310 in the IT environment. The CRIS 300 can also identify specific fluents to be removed or severed from the environment to eliminate or reduce the identified risk. That is, the cybersecurity risks 310 can include a set of fluents to be removed. A minimum cut of the directed graph, computed from the expanded graph of the fluent database, establishes protection by identifying critical points where paths need to be blocked. The CRIS 300 uses both the compute node graph and the role graph to generate the expanded graph. A minimum cut algorithm is applied to find the smallest set of edges that must be removed to prevent the fulfillment of the attack chain. As further described herein, costs in the graph are associated with costs.

Examples of minimum cut algorithms that can be used include, but are not limited to, the Stoer-Wagner Algorithm, which is efficient for finding the global minimum cut of a weighted graph. The Edmonds-Karp Algorithm, an implementation of the Ford-Fulkerson method, is effective for identifying a minimum cut by determining the maximum flow in the graph. The Push-Relabel Algorithm is another approach for solving maximum flow problems, particularly useful for dense graphs, where it adjusts flow by pushing excess flow along paths and relabeling nodes. Karger's Algorithm is a randomized algorithm that repeatedly contracts edges to find the minimum cut, making it especially useful for large graphs where deterministic algorithms may be computationally expensive. These algorithms enable the CRIS 300 to efficiently identify critical points in the expanded graph where paths should be severed to mitigate cybersecurity risks.

The cybersecurity risks 310 are identified and analyzed by constructing and traversing directed graphs that represent potential attack paths through the IT infrastructure. The CRIS 300 may output visualizations of the graph in a user interface. In an example, only full paths through the graph are displayed to reduce the clutter in the visualization. Each path through the graph corresponds to an identified attack chain, with edges color-coded or weighted to reflect their traversal cost or risk level. Critical paths, which represent the highest likelihood of being exploited, may be highlighted in red to draw attention. Additionally, the visualization may include a side panel listing the fluents associated with each edge. For example, a user may select one or more edges and/or nodes in the visualization and the CRIS 300 lists the associated fluents in the side panel.

In cases where a critical attack path is identified, the system automatically generates alerts, prompting immediate action from security teams. These alerts, which may appear both on the interface and as push notifications or emails, contain detailed information about the identified risks, including the specific fluents that contribute to the vulnerability. The visualization further aids mitigation efforts by offering a list of fluents that, if severed, would break the attack path. For example, if severing the "CAN_

REACH_INTERNET($cn_1$)" fluent would prevent an exfiltration attempt, the interface will recommend that mitigation action.

Said another way, the goal of the CRIS 300 is to establish protection against attack chains by eliminating the fluents that enable them. Because the fulfillment of an attack chain is modeled as the existence of a path in the expanded graph, protection can be achieved by eliminating all such paths. Again, this task is equivalent to finding a cut in the graph that separates the attacker from the target resource. Each fluent in the environment is assigned a cost, and these costs are reflected in the weights of the directed edges in the expanded graph. The goal is to find the minimum cut—the cheapest set of edges or fluents to eliminate—so that the attack chain can no longer be fulfilled. The protection strategy is thus defined as the elimination of a set of fluents, typically minimizing the cumulative cost, where the sum of costs for eliminating selected fluents should be as small as possible. The CRIS 300 may receive a costs table 308. The costs table 308 may associate a cost with each different type of fluent. The cost table 308 is used to assign weights to the edges in the expanded graph that the CRIS 300 generates.

The following are examples of mappings based on the Initial Access phase of the MITRE ATT&CK framework, illustrating how fluents can be associated with specific techniques and attack steps within this phase. The mapping 304 specifies how particular fluents align with stages or techniques in an attack chain.

The technique T1190 (Exploitation of Public-Facing Application) involves taking advantage of vulnerabilities in applications exposed to the internet. This technique corresponds to the fluent IS_REACHABLE_FROM_INTERNET (cn), indicating that the compute node is accessible from the internet, combined with the fluent HAS_RCE(cn), reflecting that the node contains a remote code execution (RCE) vulnerability. Thus, the technique T1190 can be mapped to the sequence of fluents IS_REACHABLE_FROM_INTERNET(cn) followed by HAS_RCE(cn), representing that an attacker first accesses the exposed node and then exploits the RCE vulnerability.

The technique T1078 (Valid Accounts) refers to the use of compromised credentials to gain unauthorized access to a system. This technique maps to the fluent HAS_ROLE(cn, r), which indicates that a specific role or permission is associated with the node. Thus, the technique T1078 can be mapped to the fluent HAS_ROLE(cn, r), modeling the scenario where an adversary leverages stolen or misconfigured credentials to gain access through valid roles.

The technique T1133 (External Remote Services) involves the use of exposed remote access services, such as RDP or SSH, to infiltrate the environment. This technique corresponds to the fluent IS_REACHABLE_FROM_INTERNET(cn), signaling that the node's service is accessible over the internet. When combined with the fluent CAN_REACH(cn, internet), it reflects that the attacker can access the node through exposed services. Thus, the technique T1133 can be mapped to the sequence IS_REACHABLE_FROM_INTERNET(cn) followed by CAN_REACH(cn, internet), capturing the scenario where the adversary identifies and exploits exposed remote services to gain access.

The technique T1059.001 (Command and Scripting Interpreter: PowerShell) involves the use of PowerShell to execute scripts, commands, or payloads on a compromised Windows environment. This technique maps to the fluent HAS_RCE(cn), indicating that the compute node supports remote code execution. Additionally, the fluent IS_REACHABLE_FROM_INTERNET(cn) reflects that the node is accessible from external sources, increasing its susceptibility to remote exploitation. A more specific condition may involve determining whether the target node is running a Windows operating system and whether PowerShell is enabled, which adds another layer of granularity to the scenario. For example, fluents such as isWindows(cn) or has_OS(cn, "Windows") can indicate the operating system type, while isPowerShellEnabled(cn) or isEnabled(cn, "PowerShell") can verify if PowerShell is active on the node. Thus, the sequence of fluents representing this technique can be expressed as IS_REACHABLE_FROM_INTERNET(cn), followed by HAS_RCE(cn), and a conditional check for the fluents indicating PowerShell availability.

The technique T1566.001 (Spearphishing Attachment) describes scenarios where adversaries send phishing emails with malicious attachments to trick recipients into executing malware. This technique is modeled through the fluent HAS_ROLE(email_server, inbound_attachment_access), indicating that the email server has the ability to receive and process email attachments. Thus, the technique T1566.001 can be mapped to the fluent HAS_ROLE(email_server, inbound_attachment_access), representing a scenario where the attacker leverages the email server's configuration to deliver malicious payloads.

These mappings are but mere illustrations how the CRIS 300 generalizes attack techniques by associating them with relevant fluents from the fluent store 106. By leveraging combinations such as IS_REACHABLE_FROM_INTERNET(cn) followed by HAS_RCE(cn), the CRIS 300 dynamically models potential attack paths within the IT infrastructure. The expanded graph generated by the CRIS 300 captures the relationships between attack techniques and infrastructure components, providing a comprehensive view of possible attack chains to enhance the identification and mitigation of cybersecurity risks.

The process of converting fluents by the CRIS 300 into a directed graph (also referred to as an expanded graph) is now described at a high level. The process provides a structured way to explicitly represent attack chains. Fluents are used to construct interconnected graphs. Whereas the set of fluents and the definition of (partial) attack chains is an implicit representation of attack chains, the expanded graph represents the attack chains in the explicit way. As already mentioned, the expanded graph allows the CRIS 300 to efficiently detect and analyze attack paths through graph traversal, instead of relying on computationally expensive combinatorial searches.

As mentioned, binary fluents define relationships between two entities, such as compute nodes or roles. Examples include CAN_REACH($cn_1$, $cn_2$), which indicates that one compute node can connect to another, and CAN_ASSUME ($r_1$, $r_2$), which reflects that a role escalation from $r_1$ to $r_2$ is possible. To illustrate, a probe tool may identify that the administrative password of the database administrator to a certain databased on a certain node is stored in plain text in a text file. As such, any user having role $r_1$ can assume the database administrator simply by gaining access and reading the text file.

The CAN_REACH($cn_1$, $cn_2$) binary fluents form a compute node graph, capturing network connectivity; and the CAN_ASSUME($r_1$, $r_2$) fluents form a role graph, representing role-based permissions and escalations. A third binary fluent, HAS_ROLE(cn1, r1), interlinks the compute node graph and the role graph, reflecting that a specific role is available on a given compute node. These relationships are represented as directed edges, or digraphs, as they are not necessarily symmetric. Given a binary fluent, two nodes corresponding to the entities involved in the relationship are created, and an edge is directed from one node to the other to represent the relationship between them.

Unary fluents, on the other hand, capture properties or permissions associated with individual entities. For example, IS_REACHABLE_FROM_INTERNET($cn_1$) indicates, if true, that a compute node is exposed to the internet, while HAS_RCE($cn_1$), if true, denotes that the node is vulnerable to remote code execution. These unary fluents generate additional layers in the graph.

Given a unary fluent, the process involves creating two layers in the graph-one representing the entity and the other representing its property. An edge between the layers is formed based on the state of the fluent (e.g., if the property holds true). This layered structure ensures that each unary fluent can be mapped to a node-edge-node relationship within the graph.

Once the binary and unary fluents are processed, the CRIS 300 combines the compute node graph and the role graph into an expanded graph. This expanded graph represents all relevant attack paths within the IT infrastructure. Attack chains, defined implicitly by the fluent database, are now explicitly represented as directed paths within the expanded graph. The design of this graph provides a compact, ground-level representation of potential attack scenarios. Again, the core benefit of the expanded graph is that it transforms the problem of attack chain analysis into a graph traversal problem—a polynomial-time problem—rather than relying on combinatorial search techniques.

The expanded graph is constructed with partial attack chains in mind. Partial attack chains represent fragments of potential attack paths, and their composition ensures that the graph covers all possible attack scenarios. The CRIS 300 generates layers and edges mechanically, allowing the model to scale with increased complexity as new attack chains are added. Whether fluents are unary, binary, or even higher-order (ternary, quaternary, etc.), the CRIS 300 follows a consistent approach for incorporating them into the expanded graph, ensuring comprehensive and adaptable attack chain analysis.

Graph expansion is defined on top of partial attack chains. A specific composition of partial attack chains is assumed to be specified to cover all possible attack chains.

In general, the possible compositions of partial attack chains are defined by a partial attack chain composition digraph. Vertices (i.e., nodes) of the digraph are the partial attack chain types and directed edges define the sequencing of partial chains. A topological ordering of vertices of the attack chain composition digraph is defined where a node corresponding to the Initial Access phase represents the root and final phases of attack are represented by the leaves. The expanded diagraph enables answering the question: Can an attack chain specified by partial attack chains and partial attack chain composition digraph be fulfilled in the given fluent database? The question can be answered procedurally via combinatorial search combined with checking of permissions and properties in individual compute and role nodes. As already mentioned, the question can be answered via path finding in an expanded graph.

As becomes clear from this disclosure, the expanded graph is not a single static structure; rather, it is built by creating multiple copies of both compute nodes and role nodes, as necessary, for each partial attack chain. This ensures that the CRIS 300 can accurately represent how different attack chains interact with the IT environment, even when the same nodes and roles are involved in multiple phases or techniques.

In the expanded graph, layers representing different stages or properties associated with nodes (e.g., role escalations or property checks like HAS_RCE) are created. When a node participates in multiple partial attack chains, multiple instances (copies) of that node are created, one for each partial attack chain. This separation prevents overlaps or conflicts between chains, ensuring that each chain is analyzed independently. The expanded graph is defined for each individual partial attack chain. For example, if the Initial Access phase consists of five distinct partial attack chains, the CRIS generates five corresponding graph expansions. Each graph expansion models the nodes, roles, and fluents relevant to that specific partial attack chain. The use of multiple copies enables the system to analyze each partial chain independently while maintaining the interdependencies across the expanded graph.

Examples of partial attack chains for the Initial Access phase are as follows. In these examples, Each partial attack chain technique follows a specific path involving unique fluents; and multiple copies of the same node (e.g., a compute node cn) may be used across different graph expansions for SSRF, RCE, and credential leaks. This ensures that each attack path is analyzed independently, with separate graph layers and nodes for each partial attack chain technique.

1) Initial access via exploiting exposed vulnerabilities (fluents: IS_REACHABLE_FROM_INTERNET(cn) & HAS_RCE(cn))
2) Initial access via Server-Side Request Forgery (SSRF) exploit (fluents: IS_REACHABLE_FROM_INTERNET(cn) & HAS_SSRF(cn))
3) Initial access via credential leak (fluents: IS_REACHABLE_FROM_INTERNET(cn) & HAS_EXPOSED_ACCESS_KEY(cn))

Each copy of a node exists within a specific layer corresponding to a particular phase or partial attack chain. Binary fluents such as CAN_REACH($cn_1$, $cn_2$) or CAN_ASSUME ($r_1$, $r_2$) generate edges between nodes in different layers or between copies of the same nodes in different phases. Unary fluents, such as HAS_RCE or IS_REACHABLE_FROM_INTERNET, connect nodes across layers based on whether those properties hold true.

The use of multiple node copies ensures that each graph expansion accurately represents the flow and dependencies within a particular attack chain, while still interconnecting with other chains where necessary. For example, a partial attack chain in the Privilege Escalation phase may depend on the result of a partial chain from the Initial Access phase. However, because the nodes are expanded separately for each partial attack chain (e.g., phase), the partial attack chains are analyzed independently, but linked through defined interdependencies (e.g., via fluents like HAS_ROLE).

In general, and as alluded to already, the process of transforming fluents into an expanded graph involves creating nodes and edges based on the type of fluent. When a unary fluent (representing a property or attribute of a single node) is involved, the CRIS 300 creates two copies of the node with an edge connecting them to reflect the property's presence. In the case of binary fluents, the approach depends on the type of nodes involved. For binary fluents connecting nodes of the same type (e.g., two compute nodes), only one copy of each node is created, with a directed edge connecting them to represent their relationship. Similarly, for binary fluents involving different node types (e.g., a compute node and a role node), one copy of each node type is created, and an edge is added to represent the connection between them.

This structured approach ensures that all relationships and properties are accurately reflected in the expanded graph, while maintaining a compact representation.

Herein, standard graph theoretical notation G=(V, E) is used, where G is a graph consisting of a finite set of vertices V that are connected by a set of edges E. Edges can be undirected (undirected graph) denoted {u, v}∈E or directed (digraph) denoted (u, v)∈E, where the orientation plays role, that is (v, u) is different from (u, v).

The expansion for a given partial attack chain is an acyclic digraph $G_{exp}=(V_{exp}, E_{exp}, V_{entry}, V_{exit})$, where, $V_{entry} \subseteq V$ and $V_{exit} \subseteq V$ define vertices where the expansion is connected to the expansion for preceding partial attack chain, where precedence is defined by the partial attack chain composition digraph, and to the expansion for the successor partial attack chain respectively ($V_{entry}$ or $V_{exit}$ is empty if no predecessor or no successor are defined).

Figure 4A:
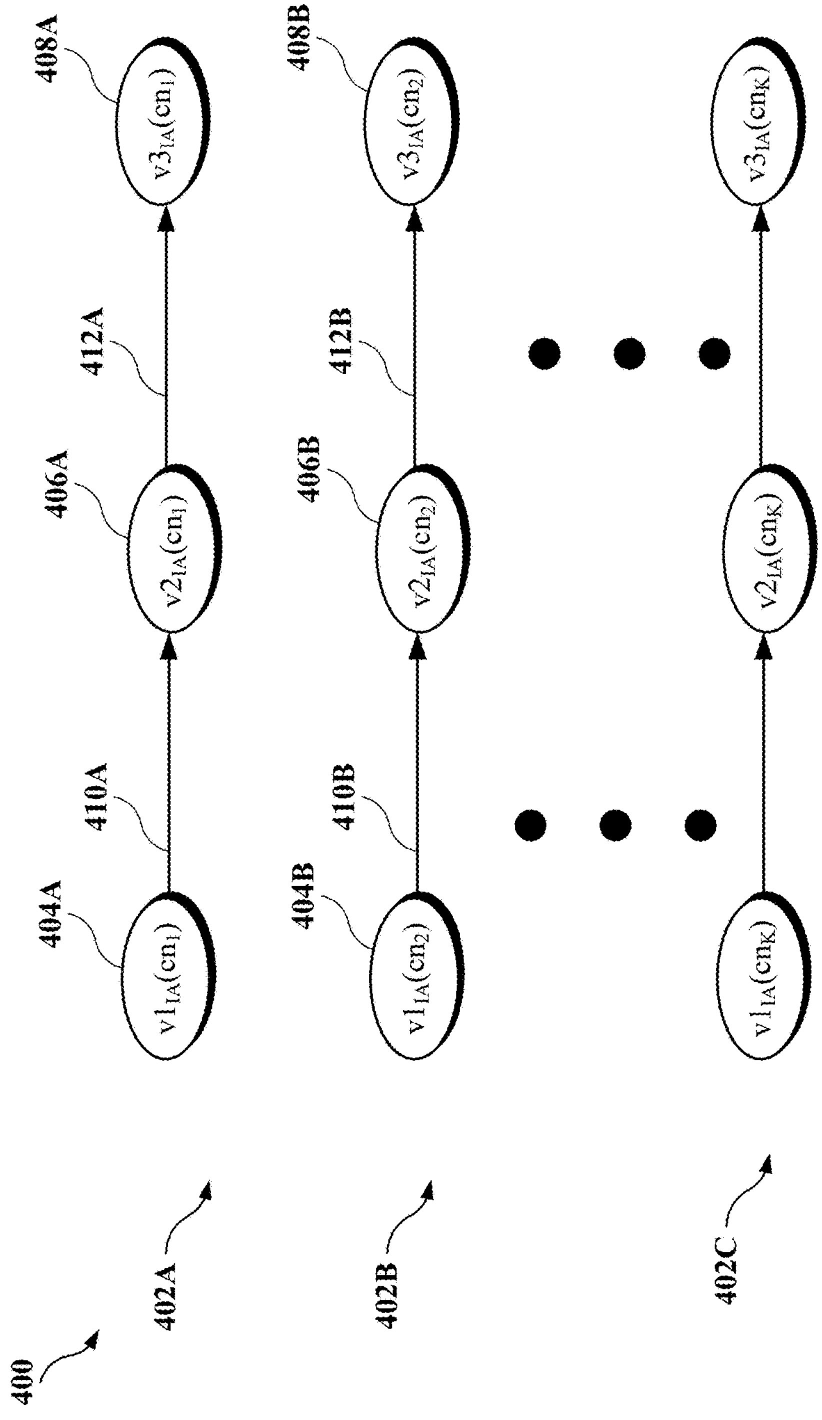
FIG. 4A is an example of generating an expanded graph for an Initial Access partial attack chain.

Expansions for selected partial attack chains for each type of partial attack chain is described with respect to FIGS. 4A-9B. FIGS. 4A-9B illustrate the process of converting partial attack chains into expanded graphs the traversals of which are used to identify cybersecurity risks. The attack chain used with FIGS. 4A-9B is or a variation thereof as indicated with respect to FIGS. 9A-9B:

Initial Access ⟶ Lateral Movement ⟶
Collection ⟶ Lateral Movement ⟶ Exfiltration FIG. 4A is an example 400 of generating an expanded graph for an Initial Access partial attack chain. The Initial Access partial attack chain illustrated in the example 400 is that of nodes that are reachable from the internet and that have remote code execution (RCE) enabled. This partial attack chain may be mapped to a single compute node, cn, where the fluents IS_REACHABLE_FROM_INTERNET (cn) and HAS_RCE(cn) are true.

The CRIS defines a graph $G_{exp}(IA)=(V_{exp}(IA), E_{exp}(IA), V_{entry}(IA), V_{exit}(IA))$. For each compute node for which these properties are true, a respective path is generated. The example 400 illustrates that these fluents are true for compute nodes $cn_1$, $cn_2$, . . . , $cn_K$. A path (e.g., paths 402A, 402B, and 402C) consists of three vertices for each compute node for which both unary fluents HAS_RCE( ) and IS_REACHABLE_FROM_INTERNET( ) hold.

A such, the path 402A includes the vertices 404A, 406A, 408A, labeled $v1_{IA}(cn_1)$, $v2_{IA}(cn_1)$, and $v3_{IA}(cn_1)$, respectively; and the path 402B includes the vertices 404B, 406B, 408B, labeled $v1_{IA}(cn_2)$, $v2_{IA}(cn_2)$, and $v3_{IA}(cn_2)$, respectively. The subscript "IA" indicates that these nodes are of type "Initial Access." Edges 410A, 410B (e.g., edges $(v1_{IA}(cn_1), v2_{IA}(cn_1))$ and $(v1_{IA}(cn_2), v2_{IA}(cn_2))$) correspond to the IS_REACHABLE_FROM_INTERNET( ) fluent. The costs associated with such edges are set to the cost of the fluent IS_REACHABLE_FROM_INTERNET( ). Edges 412A, 412B (e.g., edges $(v2_{IA}(cn_1), v3_{IA}(cn_1))$ and $(v2_{IA}(cn_2), v3_{IA}(cn_2))$) correspond to the HAS_RCE( ) fluent. The costs associated with such edges are set to the cost of the fluent HAS_RCE( ).

Figure 4B:
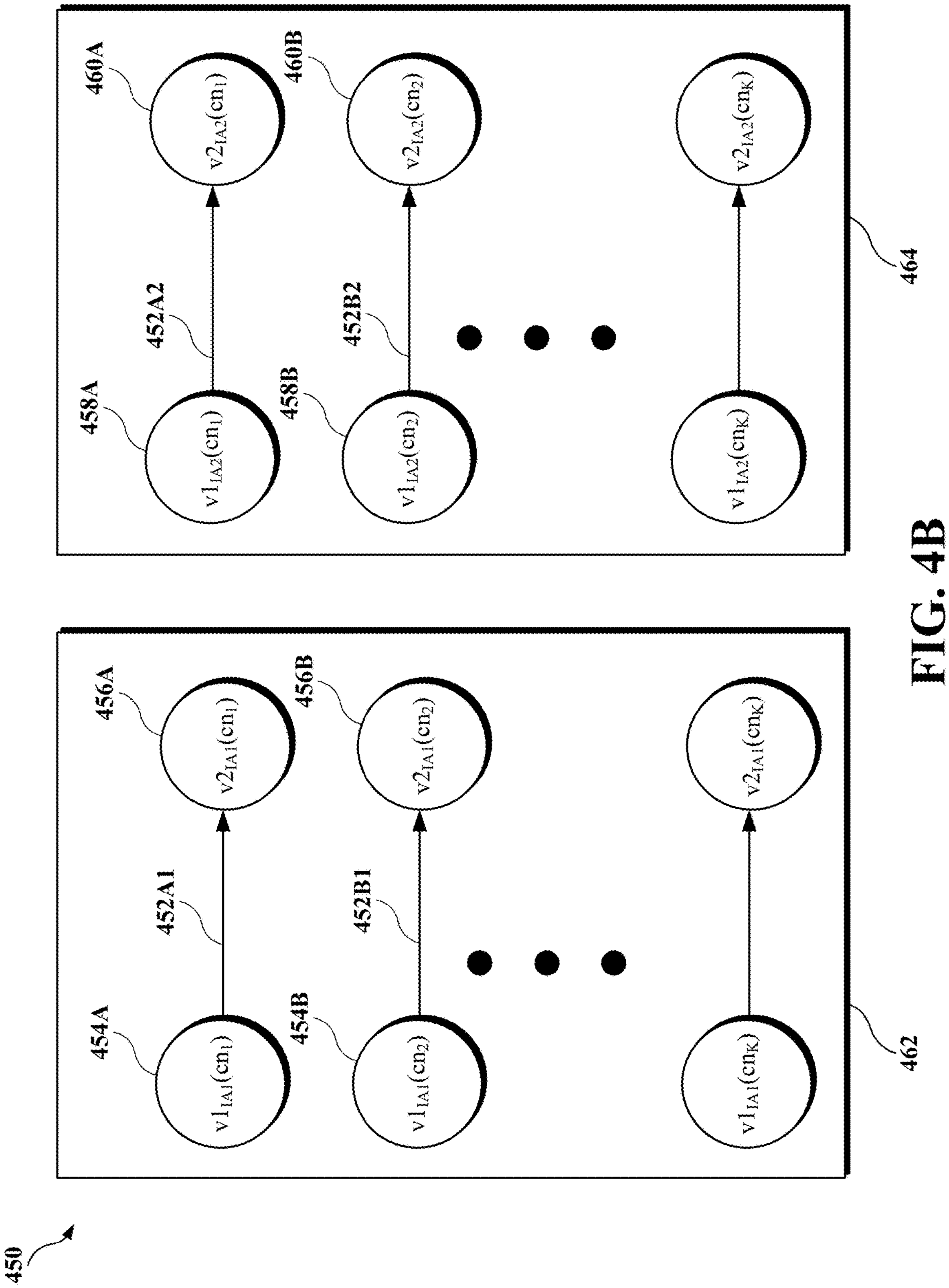
FIG. 4B illustrates an example of creating micro-partial chains.

FIG. 4B illustrates an example 450 of creating micro-partial chains. At least some of the fluents may be involved in more than one partial attack chain. For a given node, since multiple techniques may be using the same fluent (in combination with other fluents), the number of copies for the nodes can become large and result in large memory usage.

As such, micro-partial chains are useful to avoid redundancy and duplication in the expanded graphs.

To reduce the number of edges in expansions for partial chains that are derived from the same fluent, micro-partial chains are used. A micro-partial chain decomposes an original partial chain into smaller non-overlapping sub-chains such that expansion for individual sub-chains (i.e., micro-partial chains) can be shared among expansions for multiple partial chains, such as described with respect to FIG. 9A. The shared part of the expansion eliminates duplicate edges. Micro-partial chains effectively consolidates common parts of techniques, so that they are not repeated again and again in the expanded graph.

FIG. 4B illustrates an approach to creating micro-partial chains by decomposing a larger chain, as shown in FIG. 4A, into distinct segments that can be interconnected with other chains. This decomposition involves splitting the chain into two segments by duplicating the intermediate vertices and organizing them as separate right and left vertices within the new chains. To illustrate, the edges 410A and 410B are each split into edges (e.g., edges 452A1-452A2 and 452B1-452B2, respectively) with nodes labeled with subscripts IA1 and IA2 as shown with respect to nodes 454A-B, 456A-B, 458A-B, and 460A-B. By exposing the 'free ends' of these micro-partial chains, the CRIS allows connections from other chains to these intermediate nodes, which would otherwise be inaccessible in the original, unified structure. This approach enhances flexibility and reusability within the expanded graph. For instance, frequently used expansions, such as those involving HAS_RCE, can connect seamlessly to the start of an associated micro-chain, facilitating the integration of shared steps across multiple attack paths.

Figure 5A:
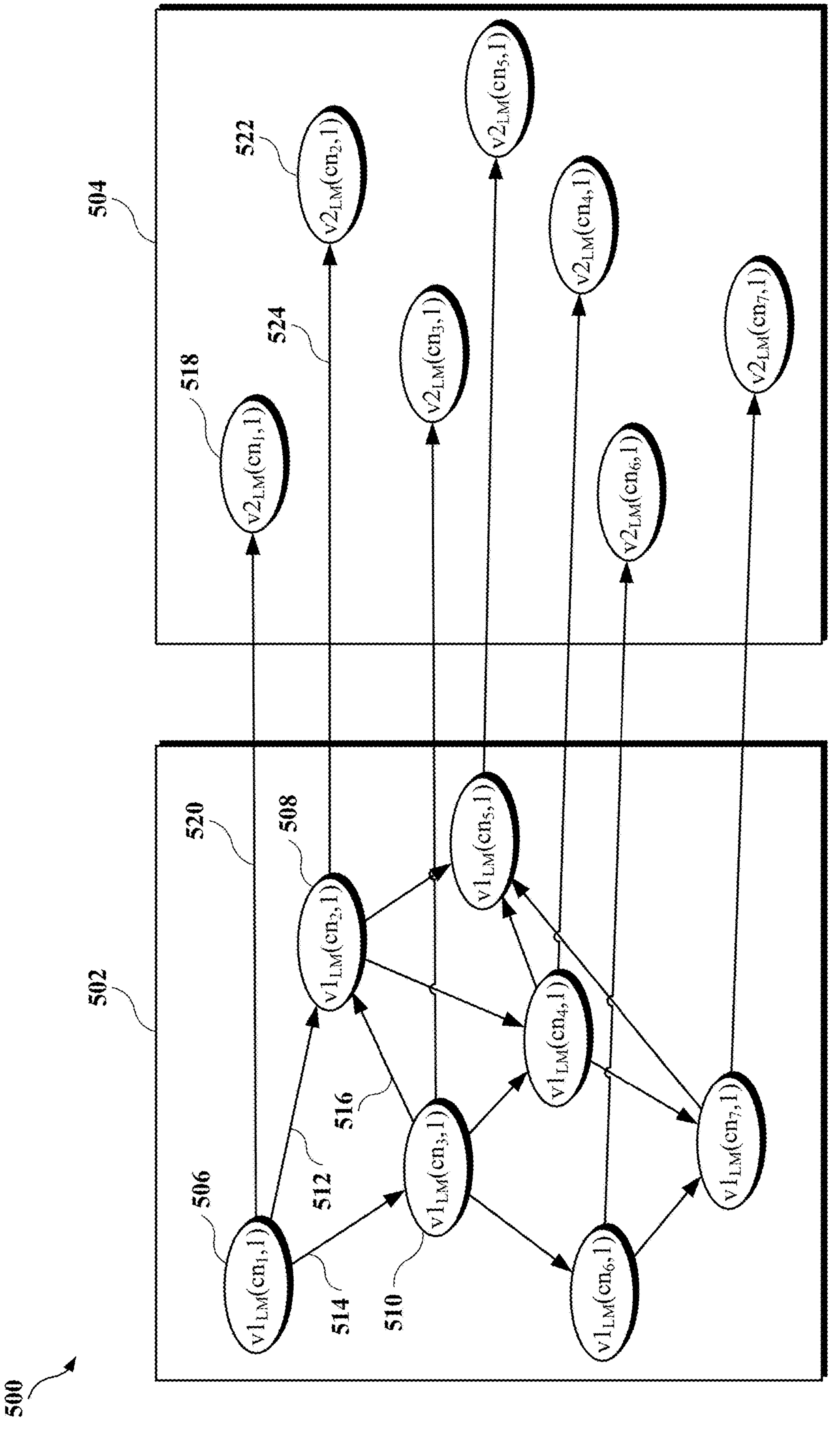
FIG. 5A is an example of generating an expanded graph for a Lateral Movement partial attack chain.

FIG. 5A is an example 500 of generating an expanded graph for a Lateral Movement partial attack chain. The Lateral Movement partial attack chain works on the compute node graph, where the CRIS checks for the existence of a path consisting of CAN_REACH( ) binary fluents followed by a check for HAS_RCE fluent in a final compute node.

The CRIS defines a graph $G_{exp}(LM)=(V_{exp}(LM), E_{exp}(LM), V_{entry}(LM), V_{exit}(LM))$ as a copy of the compute node graph. That is, for each $cn_1$ and $cn_2$ that appears in CAN_REACH($cn_1$, $cn_2$) binary fluent, vertices $v1_{LM}(cn_1,i)$, $v1_{LM}(cn_2,i)$, $v2_{LM}(cn_1,i)$, $v2_{LM}(cn_2,i)$ and an edge $(v1_{LM}(cn_1,i), v1_{LM}(cn_2,i))$ is added. The index i of a lateral movement is used to distinguish between multiple lateral movements. For example, when two Lateral Movements are possible based on the fluents, the first one is indexed by 1, and the second one is indexed by 2. Consequently, the identifiers of nodes of the expansion of these two lateral movements form disjoint sets. All vertices $v1_{LM}(cn_1,i)$ and $v1_{LM}(cn_2,i)$ are added to $V_{entry}(LM)$, and all vertices $v2_{LA}(cn_1,i)$ and $v2_{LA}(cn_2,i)$ are added to $V_{exit}(LM)$. The subscripts "LM" on the node labels indicate that these nodes are associated with the Lateral Movement type of attack chain.

The CAN_REACH( ) fluents are added to a first plane (e.g., an expansion 502). The set of fluents is assumed to include the fluents illustrated in the expansion 502. For example, the set of fluents is assumed to include CAN_REACH($cn_1$, $cn_2$), CAN_REACH($cn_1$, $cn_3$), and CAN_REACH($cn_2$, $cn_3$), amongst others. As such, nodes 506, 508, 510 (labeled $v1_{LM}(cn_1, 1)$, $v1_{LM}(cn_2, 1)$, and $v1_{LM}(cn_3, 1)$, respectively) are added, and directed edges 512, 514, and 516 corresponding to these fluents, respectively, are added. Costs associated with these edges correspond to the cost of the CAN_REACH fluent.

In a second plane (e.g., expansion 504), nodes corresponding to the HAS_RCE( ) fluents are added. For example, given the fluent HAS_RCE($cn_1$), a node 518 and an edge 520 are added; and given a fluent HAS_RCE($cn_2$), a node 522 and an edge 524 are added. Costs associated with these edges correspond to the cost of the HAS_RCE fluent.

Figure 5B:
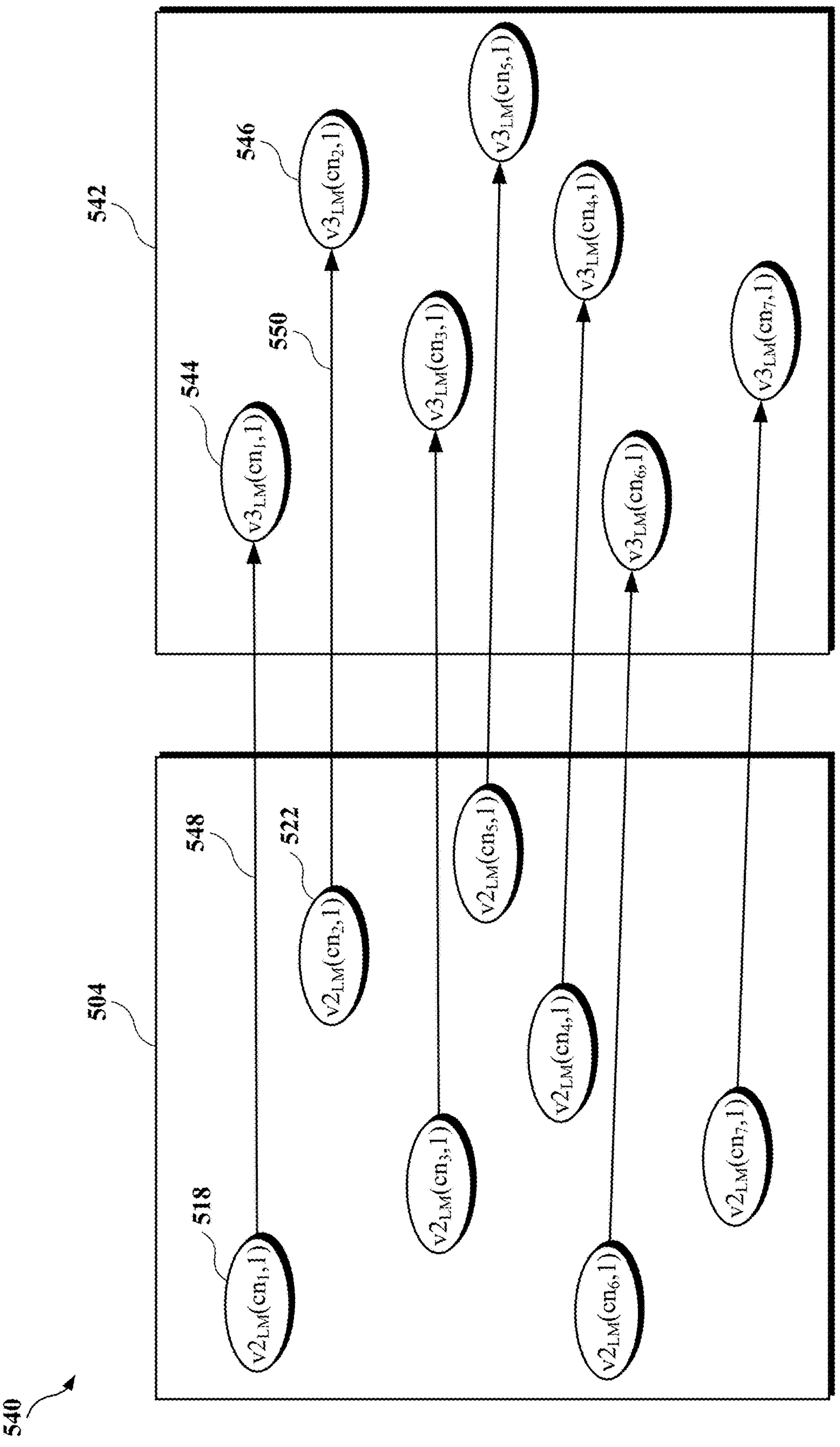
FIG. 5B illustrates an example of generating a graph expansion for Lateral Movement with micro-partial Chains.

FIG. 5B illustrates an example 540 of generating a graph expansion for Lateral Movement with micro-partial Chains. Similar to the case described with respect to FIG. 4B, the Lateral Movement partial attack chain can be decomposed into micro-chains. A first micro-chain expansion $G_{EXP}(LM1)=(V_{exp}(LM1), E_{exp}(LM), V_{entry}(LM), V_{exit}(LM1))$ corresponds to the CAN_REACH fluent; and a second micro-chain expansion $G_{EXP}(LM2)=(V_{exp}(LM2), E_{exp}(LM2), V_{entry}(LM2), V_{exit}(LM2))$ corresponds to the HAS_RCE fluent.

With respect to the first micro-chain expansion, vertices $v1_{LM}(cn_1,i)$ and $v1_{LM}(cn_2,i)$ are introduced for any CAN_REACH($cn_1$, $cn_2$) fluent existing in the fluent database (i.e., the set of fluents). All vertices are added into the $V_{entry}(LM1)$ and $V_{exit}(LM1)$ sets, that is $V_{entry}(LM1)=V_{exit}(LM1)=V_{exp}(LM1)$. The directed graph corresponding to the first micro-chain expansion can be similar to the shown in the expansion 502 of FIG. 5A.

With respect to the second micro-chain expansion, vertices $v2_{LM}(cn_1,i)$, $v2_{LM}(cn_2,i)$, $v3_{LM}(cn_1,i)$, and $v3_{LM}(cn_2,i)$ are introduced for any CAN_REACH($cn_1$, $cn_2$) fluent present in the fluent database. Although the expansion herein focuses on the HAS_RCE fluent, it incorporates vertices derived from the previous CAN_REACH micro-chain expansion. This approach enables any vertex from the CAN_REACH micro-chain to connect to an entry vertex in the HAS_RCE micro-chain, following the established interconnection rules for micro-chains. Specifically, interconnections between micro-chains are allowed if an entry vertex and an exit vertex are derived from the same compute node, ensuring continuity across related micro-chain. Vertices $v2_{LM}(cn_1,i)$, $v2_{LM}(cn_2,i)$ are included into $V_{entry}(LM2)$ and vertices $v3_{LA}(cn_1,i)$, $v3_{LA}(cn_2,i)$ are included into $V_{exit}(LA2)$.

As shown in the example 540, the CRIS adds another plane 542 with nodes, such as nodes 544, 546 and directed edges 548, 550. The directed edges 548, 550 correspond to the fluents HAS_RCE($cn_1$) and HAS_RCE($cn_2$), respectively. The costs associated with these edges correspond to the cost of the HAS_RCE fluent.

Figure 6:
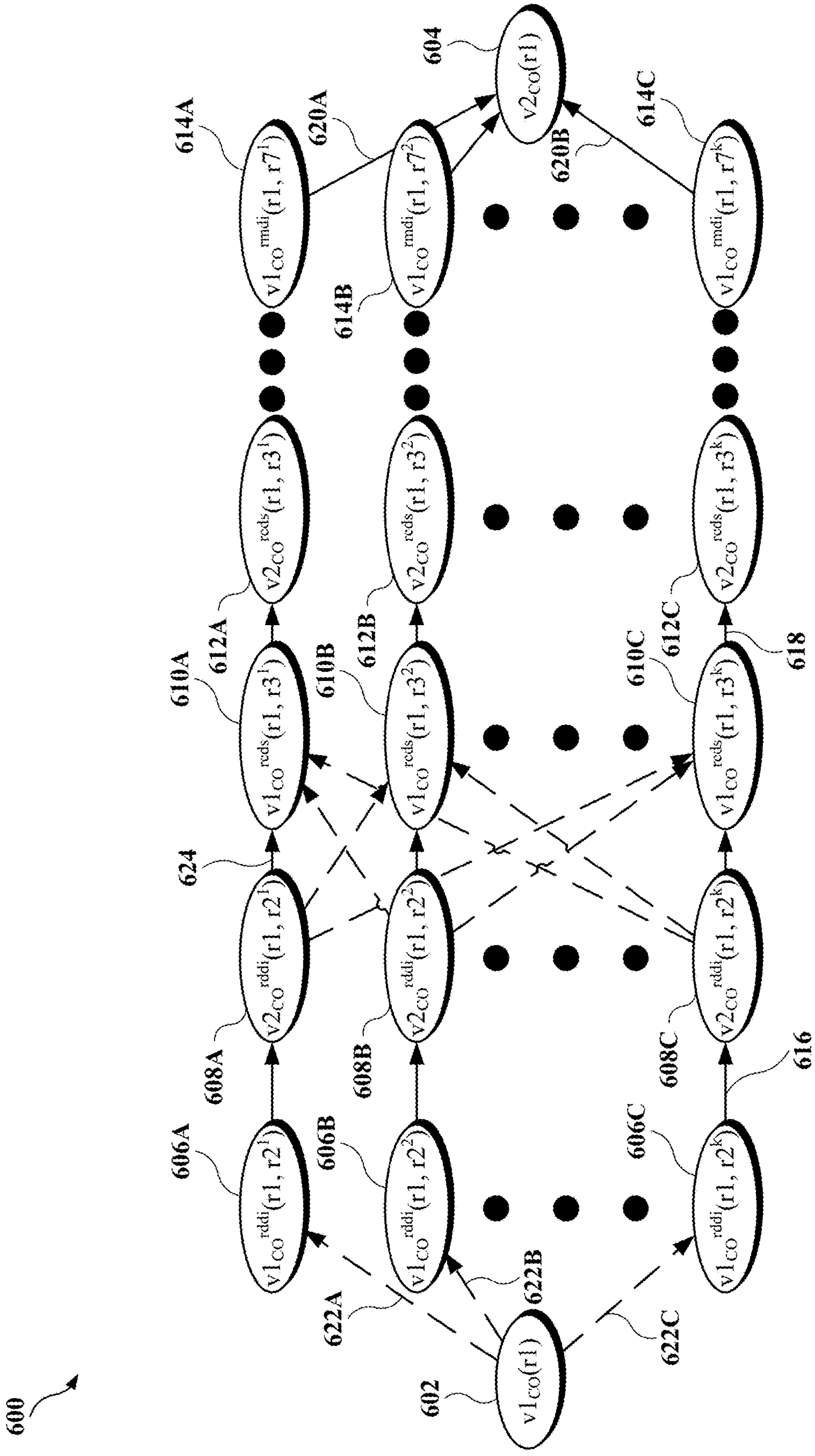
FIG. 6 is an example of generating an expanded graph for a Collection partial attack chain.

FIG. 6 is an example 600 of generating an expanded graph for a Collection partial attack chain. The Collection partial attack chain expansion is explained using a technique referred to herein as RDSStealWithSnapshot. This technique involves sequentially gathering permissions required to describe, snapshot, restore, and modify an Amazon Web Services (AWS) Relational Database Service (RDS) instance. Role transitions are modeled using the CAN_ASSUME fluent, and individual permissions are represented by unary fluents (e.g., rddi, rcds). The expanded graph models each permission step and role escalation as nodes and edges, identifying potential attack paths where an attacker can misuse RDS snapshots to exfiltrate sensitive data. It is noted that, for brevity, not all nodes and edges in the example 600 are explicitly numbered and described.

The RDSStealWithSnapshot technique (and, more generally, the Collection partial attack chain) operates on the role graph and models a sequence of actions required to gather permissions step-by-step, ultimately culminating in malicious access to RDS resources. Specifically, the permissions involved in the RDSStealWithSnapshot technique include:

rddi (DescribeInstances): Allows the listing of RDS instances and their metadata.

rcds (CreateSnapshot): Enables the creation of RDS snapshots.

rddsg (DescribeDBSubnetGroups): Provides access to database subnet group information.

edsg (access to DB subnet groups): Grants access to manage subnet group settings.

rdifds (RestoreDB InstanceFromSnapshot): Allows restoration of RDS instances from snapshots.

rmdi (ModifyDBInstance): Permits modifications to RDS instance configurations.

While the specific details of these permissions are not essential for understanding the general technique of generating expanded graphs using fluents, it is necessary to recognize that permissions must be acquired in a particular order, with each role assuming another to proceed to the next step in the attack chain and the description herein is specific to the RDSStealWithSnapshot technique.

Role transitions are represented in the graph by the CAN_ASSUME fluent, which allows one role to assume another, while individual permissions are modeled by unary fluents. Each permission corresponds to a unary fluent indicating the existence of the permission for a specific role. For example, the fluent rddi(r1) indicates that role r1 has the rds:DescribeInstances permission. The CRIS traverses the role graph to verify the existence of required permissions and whether a role can transition to another role by checking CAN_ASSUME fluents. For instance, for a given role r1, the CRIS checks if there exists a role r2 such that the CAN_ASSUME(r1, r2) fluent exists, and if the role r2 has the rddi permission (i.e., rddi(r2)). Next, the CRIS checks for role r3 with the reds permission, following the same pattern using the CAN_ASSUME fluent. Similarly, the CRIS continues the process through roles r4, r5, r6, and r7, each possessing the permissions rddsg, edsg, rdifds, and rmdi, respectively.

The CRIS generates the expanded graph as a directed acyclic graph (DAG), denoted as $G_{exp}(CO)=(V_{exp}(CO), E_{exp}(CO), V_{entry}(CO), V_{exit}(CO))$. Each role and permission creates vertices and edges to represent the flow of permissions between roles, ensuring sequential role transitions without cycles.

For each role and permission within the attack chain, the CRIS generates vertices and edges to represent the flow of permissions between roles. For example, an edge between two vertices may represent a transition from one role to another via a CAN_ASSUME fluent. The DAG structure ensures that the permissions are acquired in sequence and that role escalations occur in the correct order, preventing cycles in the graph and enabling precise modeling of potential attack paths.

The process of generating the expanded graph is now summarized. The CRIS begins by adding vertices $v1_{CO}(r1)$ (e.g., a vertex 602) and $v2_{CO}(r1)$ (e.g., a vertex 604) to serve as the entry and exit vertices of the sub-expansion, respectively. That is, For each role r1, the entry vertex is denoted as $v1_{CO}(r1)$ and the exit vertex as $v2_{CO}(r1)$. Then, and as further described herein, for every role transition involving permissions, pairs of vertices are introduced. For example $v1_{CO}^{rddi}(r1, r2)$ and $v2_{CO}^{rddi}(r1, r2)$ represent the rddi permission in the context of roles r1 and r2. Similarly, permission-specific vertex pairs are created for all other permissions (rcds, rddsg, edsg, rdifds, and rmdi). For each permission check, a pair of vertices is added with edges connecting them, representing the successful validation (e.g., existence) of the permission. For example, for the permission rddi, the edge $(v1_{CO}^{rddi}(r1, r2^i), v2_{CO}^{rddi}(r1, r2^i))$ reflects that role $r2^i$ possesses the rddi permission. If a role transition is required, the binary fluent CAN_ASSUME is used to model the transition between roles. For example, the graph would include an edge from $v2_{CO}^{rddi}(r1, r2^i)$ to $v1_{CO}^{reds}(r1, r3^i)$ if the CAN_ASSUME$(r1, r3^i)$ fluent exists, indicating that role r1 can assume role $r3^i$.

For the rddi permission, which exists for a role vertex $r_2$, the CRIS adds the vertices $v1_{CO}^{rddi}(r1, r2)$ and $v2_{CO}^{rddi}(r1, r2)$. If multiple instances of the role r2 exist, the notation $v1_{CO}^{rddi}(r1, r2^i)$ (e.g., vertices 606A-606C) and $v2_{CO}^{rddi}(r1, r2^i)$ (e.g., vertices 608A-608C) is used, where i indexes different instances.

For the reds permission, the CRIS adds the vertices $v1_{CO}^{reds}(r1, r3)$ and $v2_{CO}^{reds}(r1, r3)$, following the same indexing scheme for multiple instances, as shown by vertices 610A-610C and 612A-612C, respectively. The same pattern is applied to the other permissions: $v1_{CO}^{rddsg}(r1, r4)$ and $v2_{CO}^{rddsg}(r1, r4)$ for the rddsg permission, $v1_{CO}^{edsg}(r1, r5)$ and $v2_{CO}^{edsg}(r1, r5)$ for the edsg permission, $v1_{CO}^{rdifds}(r1, r6)$ and $v2_{CO}^{rdifds}(r1, r6)$ for the rdifds permission, and $v1_{CO}^{rmdi}(r1, r7)$ and $v2_{CO}^{rmdi}(r1, r7)$ for the rmdi permission as illustrated by vertices 614A-614C.

For each original role, such as r1, the CRIS generates a corresponding set of vertices. If another role, r1', exists, CRIS assigns it a separate set of vertices following the same naming convention (e.g., $v1_{CO}^{rddi}(r1', r2')$ and $v2_{CO}^{rddi}(r1', r2')$). Entry vertices like $v1_{CO}(r_1)$ and $v1_{CO}(r1')$ are included in $V_{entry}(CO)$, and exit vertices such as $v2_{CO}(r1)$ and $v2_{CO}(r1')$ are added to $V_{exit}(CO)$.

The CRIS then adds the following edges. Directed edges are added between each pair of vertices to represent the use of permissions. Specifically, for every role $r2^i$, an edge $(v1_{CO}^{rddi}(r1, r2^i), v2_{CO}^{rddi}(r1, r2^i))$ (such as edge 616) models the rddi permission; for every $r_3^i$, an edge $(v1_{CO}^{reds}(r1, r3^i), v2_{CO}^{reds}(r1, r3^i))$ (such as an edge 618) reflects the reds permission; and, similarly, the remaining permissions are represented by the edges: edges $(v1_{CO}^{rddsg}(r1, r4^i), v2_{CO}^{rddsg}(r1, r4^i))$ are added for each $r4^i$; edges $(v1_{CO}^{edsg}(r1, r5^i), v2_{CO}^{edsg}(r1, r5^i))$ are added for each $r5^i$; edges $(v1_{CO}^{rdifds}(r1, r6^i), v2_{CO}^{rdifds}(r1, r6^i))$ are added for each role $r6^i$; and edges $(v1_{CO}^{rmdi}(r1, r7^i), v2_{CO}(r1))$ (such as edges 620A and 620B) are added for each $r7^i$.

In addition to these, the CRIS adds the following edges to model role transitions: 1) For each $r2^i$, an edge $(v1_{CO}(r1), v1_{CO}^{rddi}(r1, r2^i))$ (such as edges 622A-622C) is added to reflect the initial transitions based on the CAN_ASSUME$(r1, r2^i)$ fluents; and 2) for each $r_7^i$ a directed edge connecting a vertex $v1_{CO}^{rmdi}(r1, r7^i)$ and $v2_{CO}(r1)$ (such as the edges 620A-620B).

The CRIS then adds interconnections between vertices for individual permissions as follows. Directed edges $(v2_{CO}^{rddi}(r1, r2^i), v1_{CO}^{reds}(r1, r3^j))$ (such as an edge 624) are added representing transitions between any pair of roles $(r2^i, r3^j)$ if the CAN_ASSUME$(r1, r3^j)$ fluent exists. These transitions continue for each subsequent role and permission in the chain. A directed edge $(v2_{CO}^{reds}(r1, r3^i), v1_{CO}^{rddsg}(r1, r4^j))$ is added for each pair or roles $(r3^i, r4^j)$ if the fluent CAN_ASSUME$(r1, r4^j)$ holds (i.e., exists). A directed edge $(v2_{CO}^{rddsg}(r1, r4^i), v1_{CO}^{edsg}(r1, r5^j))$ is added for each pair of roles $(r4^i, r5^j)$ if the fluent CAN_ASSUME$(r1, r5^j)$ holds. A directed edge $(v2_{CO}^{edsg}(r1, r5^i), v1_{CO}^{rdifds}(r1, r6^j))$ is added for each pair of roles $(r5^i, r6^j)$ if the fluent CAN_ASSUME$(r1, r6^j)$ holds. And a directed edge $(v2_{CO}^{rdifds}(r1, r6^i), v1_{CO}^{rmdi}(r1, r7^j))$ is added for each pair of roles $(r6^i, r7^j)$ if the fluent CAN_ASSUME$(r1, r7^j)$ exists.

To summarize, the following describes how CRIS models permissions and role transitions within the expanded graph for the RDSStealWithSnapshot technique. Each permission and role transition is represented as a directed edge between nodes, with the associated costs reflecting the effort or risk required to traverse these edges. The sequence of edges mirrors the step-by-step accumulation of permissions and role transitions necessary to fulfill the attack chain. Below is a further description of some of the edges shown in the example, 600.

Directed edges corresponding to fluents and role transitions are defined as follows. The directed edges $(v1_{CO}^{rddi}(r1, r_2^i), v2_{CO}^{rddi}(r1, r_2^i))$ (e.g., the edge 616) correspond to the rddi$(r_2^i)$ fluents, the costs of these edges correspond to the cost of the rddi fluent. The directed edges $(v1_{CO}^{reds}(r1, r_3^i), v2_{CO}^{reds}(r1, r_3^i))$ (e.g., the edge 618) correspond to the reds$(r_3^i)$ fluents, the costs of these edges correspond to the cost of the reds fluent. The directed edges $(v1_{CO}^{rddsg}(r1, r_4^i)$ $v2_{CO}^{rddsg}(r1, r_4^i))$ correspond to the rddsg$(r_4^i)$ fluents, the costs of these edges correspond to the cost of the rddsg fluent. The directed edges $(v1_{CO}^{edsg}(r1,r_5^i), v2_{CO}^{edsg}(r1,r_5^i))$ correspond to the edsg$(r_5^i)$ fluents, the costs of these edges correspond to the cost of the edsg fluent. The directed edges $(v1_{CO}^{rdifds}(r1,r_6^i), v2_{CO}^{rdifds}(r1,r_6^i))$ correspond to the rdifds$(r_6^i)$ fluents, the costs of these edges correspond to the cost of the rdifds fluent. The directed edges $(v1_{CO}^{rmdi}(r1,r_7^i), v2_{CO}(r1))$ correspond to the rmdi$(r_7^i)$ fluents, the costs of these edges correspond to the cost of the rmdi fluent. States another way, the costs of these edges correspond to the costs of their respective fluents.

Role transitions are similarly modeled through CAN_ASSUME fluents. The directed edges $(v1_{CO}(r1), v1_{CO}^{rddi}(r1, r_2^i))$ (e.g., the edge 622A) correspond to the CAN_ASSUME$(r1,r_2^i)$ fluents. The directed edges $(v2_{CO}^{rddi}(r1, r_2^i), v1_{CO}^{reds}(r1, r_3^j))$ (e.g., the edge 624) correspond to the CAN_ASSUME$(r1, r_3^j)$ fluents. The directed edges $(v2_{CO}^{reds}(r1, r_3^i), v1_{CO}^{rddsg}(r1, r_4^j)))$ correspond to the CAN_ASSUME$(r1, r_4^j)$ fluents. The directed edges $(v2_{CO}^{rddsg}(r1, r_4^i), v1_{CO}^{edsg}(r1, r_5^j))$ correspond to the CAN_ASSUME$(r_1, r_5^j)$. The directed edges $(v2_{CO}^{edsg}(r1, r_5^i), v1_{CO}^{rdifsd}(r1, r_6^j))$ correspond to the CAN_ASSUME$(r1, r_6^j)$ fluents. The directed edges $(v2_{CO}^{rdifsd}(r1,r_5^i), v1_{CO}^{rmdi}(r1,r_6^j))$ correspond to the CAN_ASSUME$(r1, r_7^j)$ fluents. The costs of all these edges correspond to the cost of the CAN_ASSUME fluent.

A directed path from $v1_{CO}(r1)$ (i.e., the vertex 602) to $v2_{CO}(r1)$ (i.e., the vertex a 604) in the sub-expansion $G_{exp}(CO)$ exists if and only if the RDSStealWithSnapshot partial attack chain can be fulfilled in r1 with respect to the set of fluents. This is so because if the directed path from $v1_{CO}(r1)$ (e.g., the vertex 602) to $v2_{CO}(r1)$ (e.g., the vertex 604) exists, then there are role vertices r2, r3, r4, r5, r6, and r7 such that fluents rddi(r2), rcds(r3), rddsg(r4), edsg(r5), rdifsd(r6), and rmdi(r7) for which the following binary fluents hold with respect to the given fluent database: CAN_ASSUME(r1, r2), CAN_ASSUME(r1, r3), CAN_ASSUME(r1, r4), CAN_ASSUME(r1, r5), CAN_ASSUME(r1, r6), and CAN_ASSUME(r1, r7). This, in turn, exactly corresponds to the fulfillment of the RDSStealWithSnapshot partial attack chain.

On the other hand, if the RDSStealWithSnapshot partial attack chain is fulfilled with respect to the given set of fluents, then a directed path exists in the sub-expansion $G_{exp}(CO)$. Altogether, there is one-to-one correspondence between attack chains and directed paths in the sub-expansion. That is, the sub-expansion represents the set of attack the RDSStealWithSnapshot chains exactly.

Figure 7:
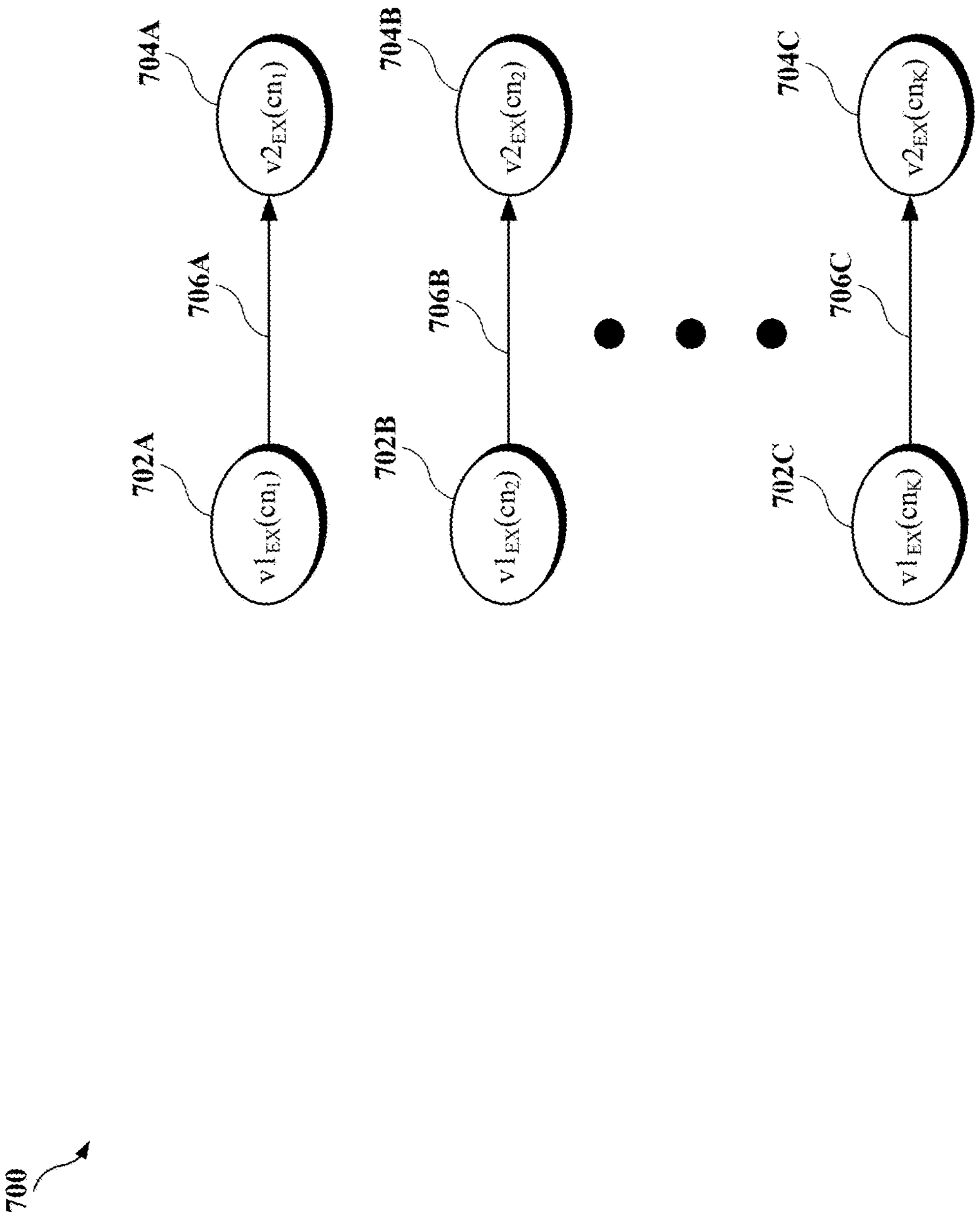
FIG. 7 is an example of generating an expanded graph for an Exfiltration partial attack chain.

FIG. 7 is an example 700 of generating an expanded graph for an Exfiltration partial attack chain. As can be appreciated, such as by reviewing the MITRE ATT&CK® framework, Exfiltration can be accomplished in any number of ways. In one example, the CRIS may be configured to identify potential exfiltration paths by checking if a compute node, cn, has direct internet access, represented by the CAN_REACH_INTERNET(cn) fluent. This fluent indicates that the compute node cn is reachable from or can establish a connection to the internet, thus posing a risk for unauthorized data exfiltration.

CRIS models an expanded graph for the exfiltration path through a subgraph $G_{exp}$(EX)=($V_{exp}$(EX), $E_{exp}$(EX), $V_{entry}$(EX), $V_{exit}$(EX)). For each compute node cn with the CAN_REACH_INTERNET(cn) fluent, the CRIS adds two vertices, $v1_{EX}$(cn) and $v2_{EX}$(cn), and a directed edge from $v1_{EX}$(cn) to $v2_{EX}$(cn), representing the internet reachability of the node. The vertex $v1_{EX}$(cn) is included in $V_{entry}$(EX), and $v2_{EX}$(cn) is included in $V_{exit}$(EX). If the directed edge exists between these vertices, the CRIS identifies it as a potential exfiltration vector.

The example 700 illustrates that the fluents CAN_REACH_INTERNET($cn_1$), CAN_REACH_INTERNET($cn_2$), . . . , CAN_REACH_INTERNET($cn_K$) exist in the set of fluents. Again, the CRIS adds two vertices for each compute node where the fluent indicates internet reachability. Specifically, vertices 702A, 702B, and 702C, which are added to the set $V_{entry}$(EX), correspond to $v1_{EX}$($cn_1$), $v1_{EX}$($cn_2$), and $v1_{EX}$($cn_K$), respectively. Similarly, vertices 704A, 704B, and 704C, which are added to the set $V_{exit}$(EX), represent $v2_{EX}$($cn_1$), $v2_{EX}$($cn_2$), and $v2_{EX}$ ($cn_K$).

Directed edges, such as edges 706A, 706B, and 706C, connect the corresponding entry and exit vertices for each compute node. These edges model the internet reachability of each node, indicating the potential for data exfiltration. For instance, the edge 706A between $v1_{EX}$($cn_1$) and $v2_{EX}$($cn_1$) reflects that the node $cn_1$ is accessible from the internet, posing a potential security risk. That is, the directed edge ($v1_{EX}$($cn_1$), $v2_{EX}$($cn_1$)) corresponds to the CAN_REACHINTERNET($cn_1$) fluent. The cost of the edge corresponds to the cost of the CAN_REACH_INTERNET fluent.

Figure 8A:
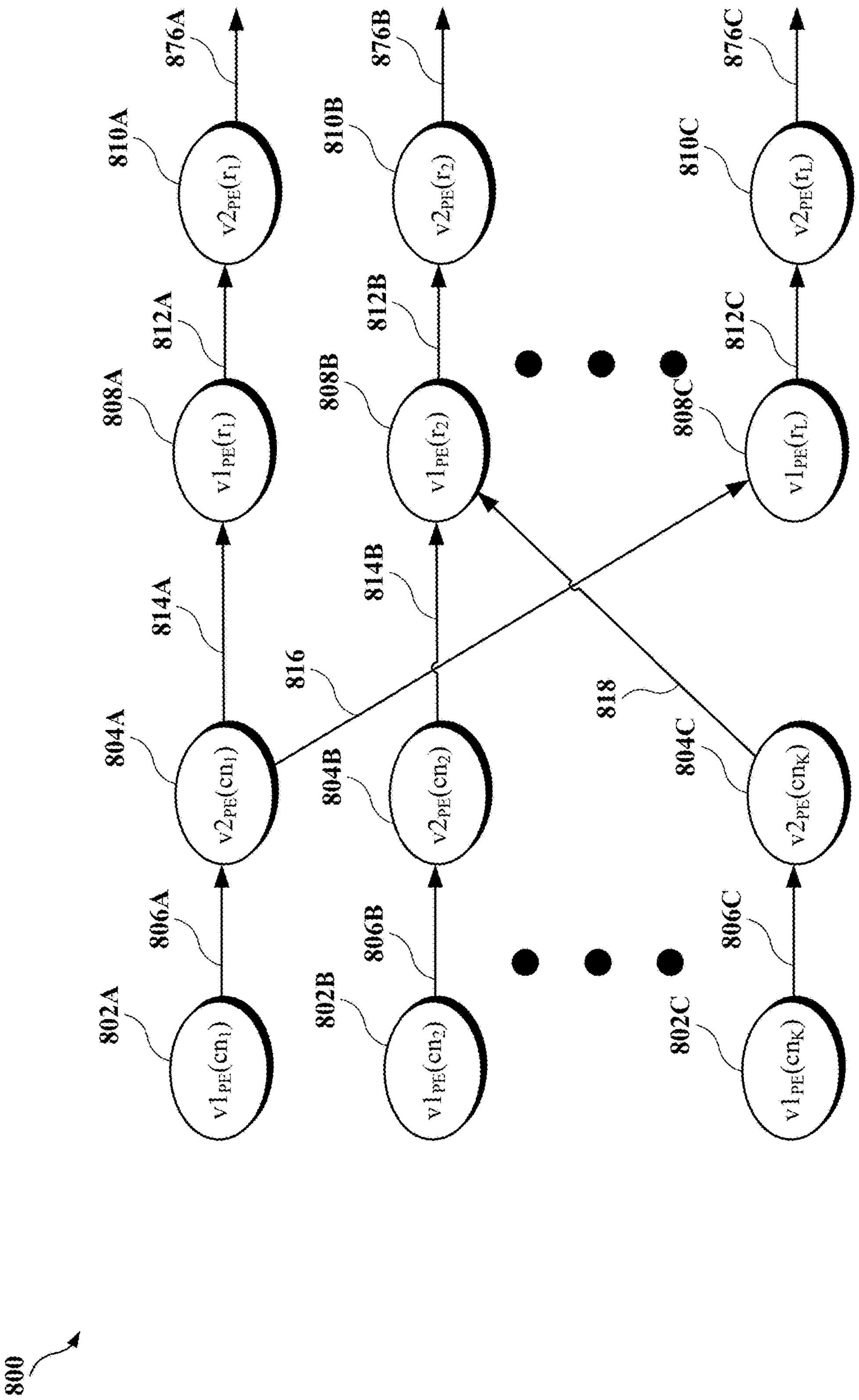
FIGS. 8A-8B illustrate an example of generating an expanded graph for a Privilege Escalation partial attack chain.
Figure 8B:
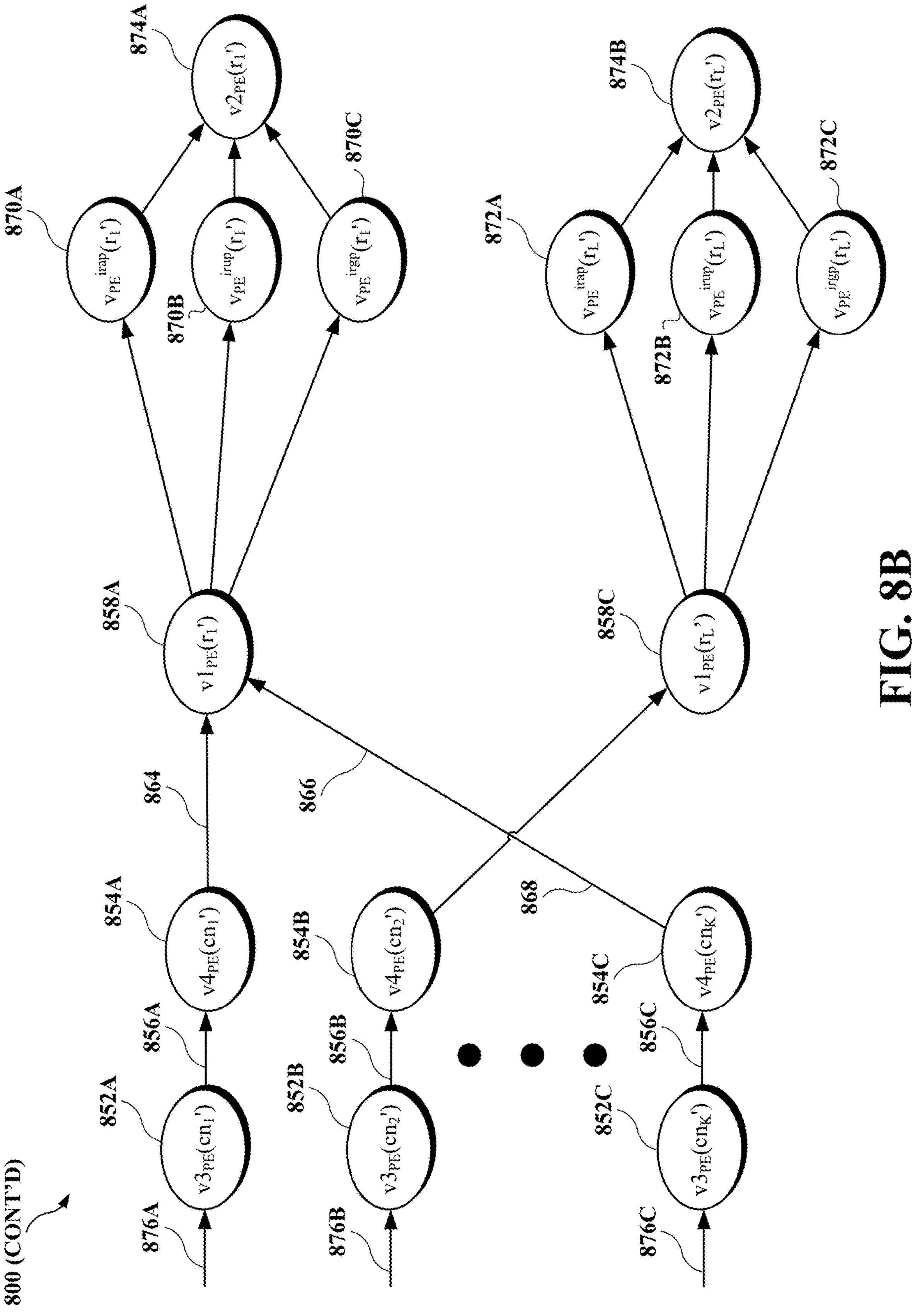

FIGS. 8A-8B illustrate an example 800 of generating an expanded graph for a Privilege Escalation partial attack chain. The Privilege Escalation partial attack chain expansion is explained using the technique VulnerableLambda. In the context of Amazon Web Services (AWS), Lambda is a serverless compute service that allows users to run code in response to events without managing infrastructure. A Vulnerable Lambda in this context refers to a misconfiguration or misuse of permissions associated with Lambda functions, which could enable unauthorized access or privilege escalation within an AWS environment. This attack chain leverages permissions and roles to escalate privileges, potentially leading to unauthorized policy changes or access to sensitive resources.

The expanded graph models the misuse of several key permissions relevant to this scenario. These include Lambda:ListFunction(llf), which grants visibility into available Lambda functions, and Lamba:InvokeFunction(lif), which allows the execution of Lambda functions. Additionally, IAM:AttachRolePolicy (iarp), IAM:AttachUserPolicy (iaup), and IAM:AttachGroupPolicy (iagp) represent permissions to attach policies to roles, users, or groups, respectively. These permissions, modeled as fluents, demonstrate how the privilege escalation process unfolds across multiple compute nodes and roles within the AWS environment.

The VulnerableLambda attack chain spans two distinct sets of compute nodes. A first set of nodes, labeled $cn_1$, $cn_2$, . . . , $cn_K$, is represented in FIG. 8A by vertices $v1_{PE}$( ) and $v2_{PE}$( ). Specifically, vertices 802A and 804A represent the two states of node $cn_1$, connected by edge 806A; similarly, vertices 802B and 804B represent node $cn_2$, connected by edge 806B; and vertices 802C and 804C represent node $cn_K$, connected by edge 806C. The edges connecting these nodes (e.g., 806A, 806B, 806C) indicate the presence of the llf permission, with the cost of each edge reflecting the difficulty or risk associated with obtaining this permission.

For each compute node, the CRIS includes role transitions to model how roles possessing specific permissions can be assumed. For example, vertices 808A and 810A represent the role $r_1$ associated with $cn_1$, connected by edge 812A, indicating that the role possesses the llf permission. This pattern is repeated for other nodes, such as $cn_2$ and $cn_K$, represented by corresponding role vertices (e.g., vertices 808B and 810B for $cn_2$, connected by edge 812B).

In FIG. 8B, the attack chain shifts focus to another set of compute nodes (depicted as $cn_1'$, $cn_2'$, . . . , $cn_K'$), represented by vertices 852A, 854A, 852B, 854B, and 852C, 854C, respectively. Edges 856A, 856B, and 856C connect the states of these nodes. The CRIS models these nodes as possessing the IS_LAMBDA( ) property, reflecting that these nodes can execute Lambda functions. The vertices for each compute node are connected by directed edges representing role escalations. For instance, edges 864, 866, and 868 interconnect role nodes (e.g., vertices 858A and 858C) to indicate transitions to roles possessing the iaup, iarp, or iagp permissions. These transitions are depicted as forks and merges, with nodes such as vertices 870A, 870B, 870C, and 874A reflecting permissions such as irap, irup, and irgp. Stated another way, In the other compute node, say $cn_1'$, it is assumed to have the IS_LAMBDA($cn_1'$) and several permissions need to be collected via roles assumed from $cn_1'$. Specifically, the attack chain checks for a role $r_1'$ that can be assumed from $cn_1'$ where either the "iarp" permission or the "iaup" permission or the "iagp" permission can be collected.

Each vertex involved in the attack chain corresponds to a specific state, role, or permission, and the directed edges represent the escalation paths. For example, edges into the nodes 872A, 872B, and 872C form a logical "OR" gate by connecting role vertices (e.g., 858A) to multiple permission vertices (e.g., vertices 870A, 870B, and 870C). The merge points (e.g., vertices 874A and 874B) ensure that only one path is required to achieve the privilege escalation, with each path reflecting the exploitation of a specific permission.

The expanded graph for the VulnerableLambda attack chain ensures that CRIS can model the sequence of permissions and role transitions required for the privilege escalation. Each part of the graph is interconnected to reflect the complete attack path, with all vertices corresponding to roles (e.g., $r_1$, $r_1'$, $r_L$) connected through bipartite graphs. For example, the CRIS adds edges from $v2_{PE}$ ($r_1$) (in FIG. 8A) to $v3_{PE}$($cn_1'$) (in FIG. 8B) and similar connections between nodes, ensuring that the attack chain is captured holistically, such as edges 876A, 876B, and 876C. Such a graph expansion provides a detailed representation of how misconfigured permissions and roles can be exploited within an AWS environment to achieve unauthorized access.

To elaborate further, the CRIS defines a subgraph $G_{exp}$(PE)=($V_{exp}$(PE), $E_{exp}$(PE), $V_{entry}$(PE), $V_{exit}$(PE)) that follows similar ideas as analogous subgraphs for the "Collection" partial attack chains described above. For example, for a given compute node, $cn_1$, $V_{exp}$(PE) includes vertices $v1_{PE}$ ($cn_1$), $v2_{PE}$ ($cn_1$) and $v1_{PE}$ ($r_1$), $v2_{PE}$ ($r_1$) for every role $r_1$ such that fluents HAS_ROLE($cn_1$, $r_1$) exists in the fluent database and $r_1$ has the "llf" permission (that is, llf($r_1$) exists in the fluent database). The node $v1_{PE}(cn_1)$ is included in $V_{entry}$(PE).

The following directed edges are added: A directed edge ($v1_{PE}$ ($cn_1$), $v2_{PE}$ ($cn_1$)) corresponding to the llf($r_1$) fluent. The cost of this edge corresponds to the cost of the llf fluent; and a directed edge ($v2_{PE}$ ($cn_1$), $v1_{PE}$ ($r_1$)) corresponding to the HAS_ROLE($cn_1$, $r_1$) fluent. The cost of this edge corresponds to the cost of the HAS_ROLE fluent; and a directed edge ($v1_{PE}$ ($r_1$), $v2_{PE}$ ($r_1$)) corresponding to the llf($r_1$) fluent. The cost of this edge corresponds to the cost of the llf fluent. The expanded graph of FIG. 8A illustrates part of the resulting expansion for the Privilege Escalation partial attack chain for the VulnerableLambda technique.

The following directed edges are also added to the expansion: A directed edge ($v3_{PE}$ ($cn_1$'), $v4_{PE}$ ($cn_1$')) corresponding to the IS_LAMBDA($cn_1$') fluent with a cost corresponding to that of the IS_LAMBDA fluent; a directed edge ($v4_{PE}$ ($cn_1$'), $v1_{PE}$($r_1$')) corresponding to the HAS_ROLE($cn_1$',$r_1$') fluent with a cost corresponding to that of the HAS_ROLE fluent; directed edges ($v1_{PE}$ ($r_1$'), $V_{PE}^{iarp}$(r')), ($v1_{PE}$ ($r_1$'), $V_{PE}^{iaup}$($r_1$')), ($v1_{PE}$ ($r_1$'), $V_{PE}^{iagp}$($r_1$')) that form a fork from $v1_{PE}$ ($r_1$') to model the 'OR' connective with costs corresponding to the costs of fluents iarp($r_1$'), iaup($r_1$'), and iagp($r_1$'), respectively; and directed edges to merge the fork are added too, that is, directed edges ($V_{PE}^{iarp}$($r_1$'), $v2_{PE}$ ($r_1$')), ($V_{PE}^{iaup}$($r_1$'), $v2_{PE}$ ($r_1$')), ($V_{PE}^{iagp}$($r_1$'), $v2_{PE}$(v')). As these edges do not correspond to any specific fluent, their costs are set to infinity (e.g., to a large number). The expanded graph of FIG. 8B illustrates part of the resulting expansion for the Privilege Escalation partial attack chain for the VulnerableLambda technique.

The two parts of the expansion are then interconnected via a complete bipartite graph, that is, all vertices $v2_{PE}(r_1)$ are connected via directed edges with all vertices $v3_{PE}(cn_1')$. The cost of these edges is set to infinity (e.g., to a large number).

Figure 9A:
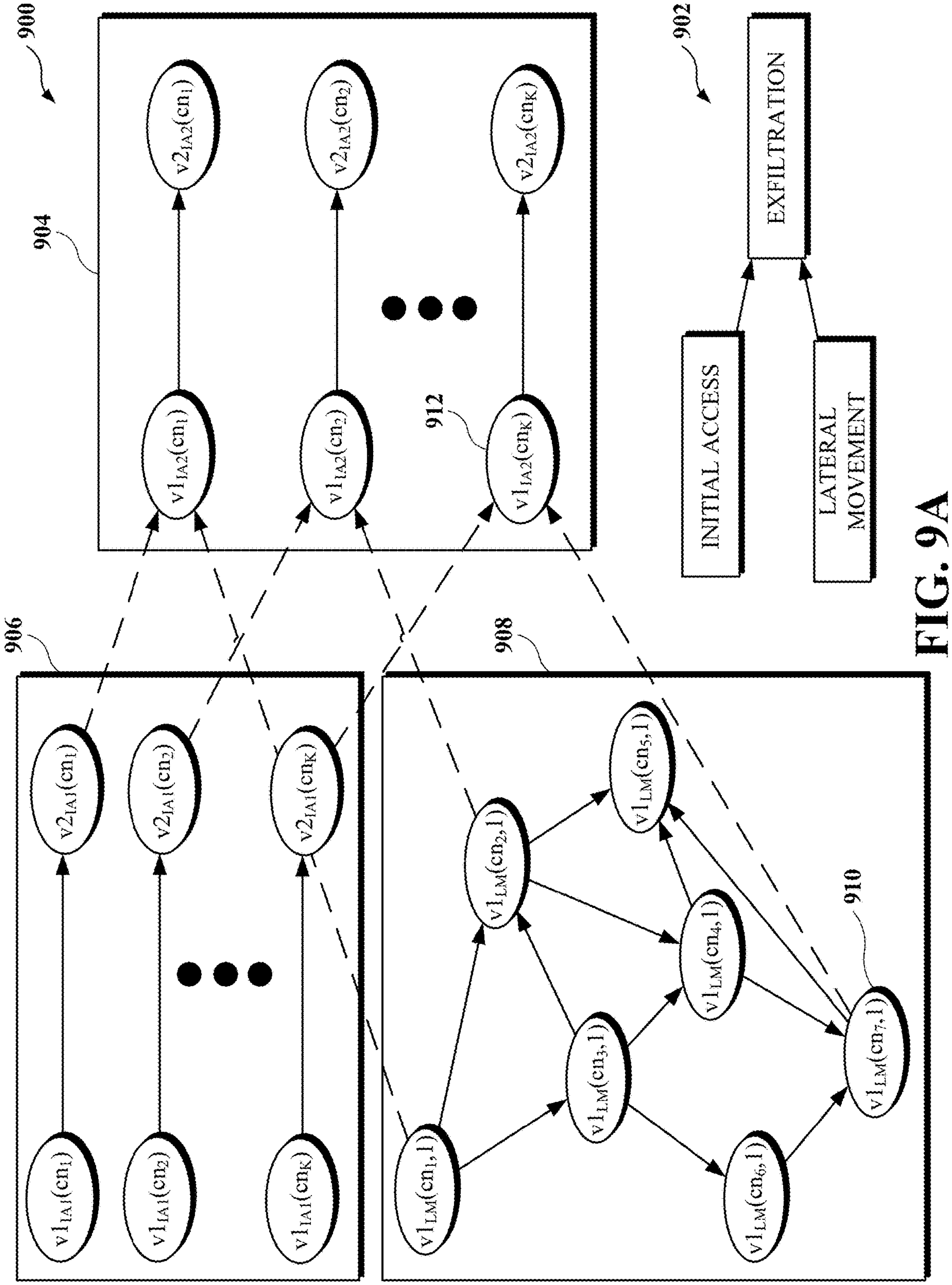
FIGS. 9A-9B illustrate examples of interconnecting graph expansions for partial attack chains.
Figure 9B:
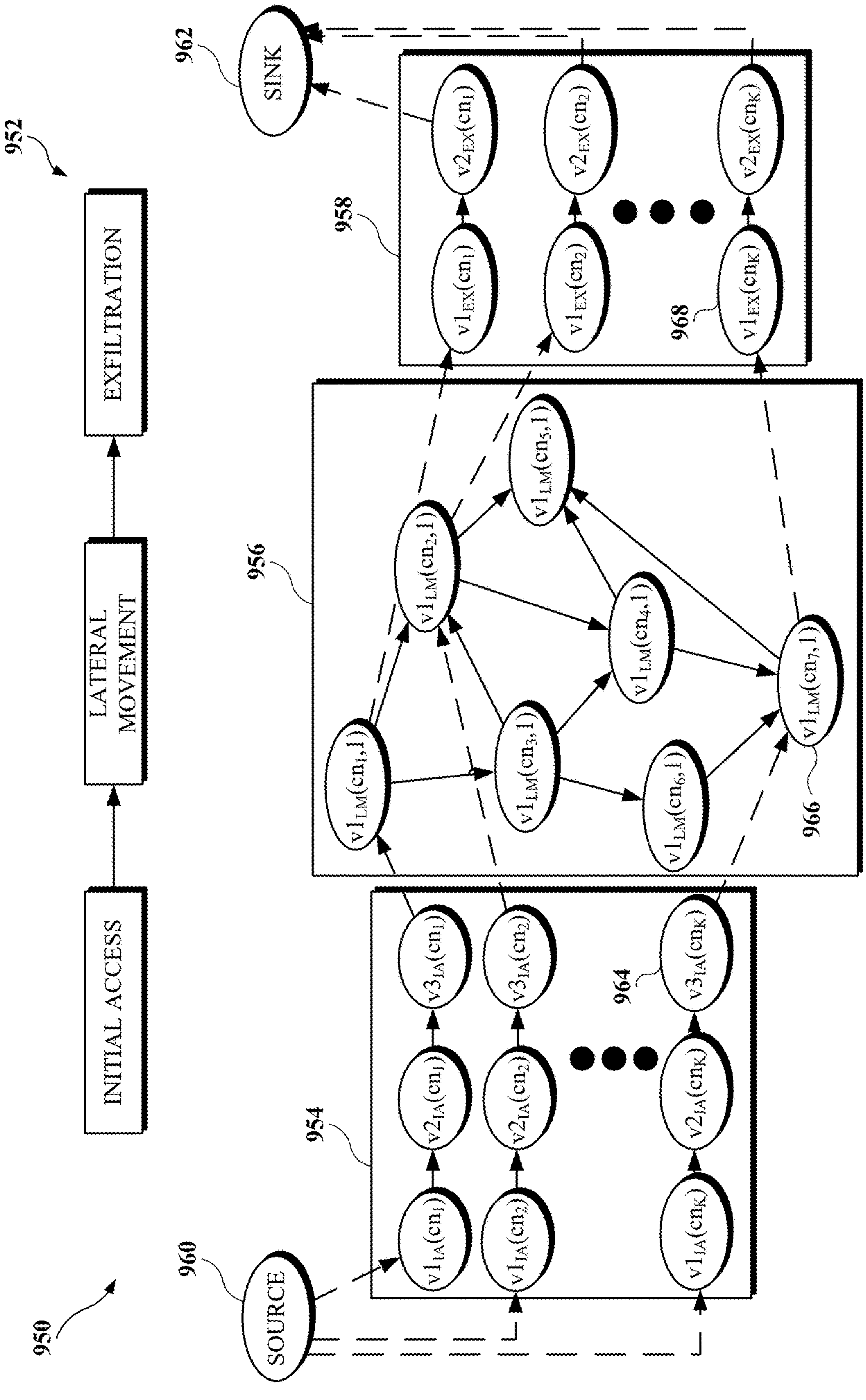

FIGS. 9A-9B illustrate examples of interconnecting graph expansions for partial attack chains. The general approach is first described, based on a technique that enables seamless transitions between individual attack phases. Each partial attack chain, such as Initial Access and Lateral Movement, is represented by its own expanded graph, as described above. These individual graph expansions are interconnected through specific entry and exit vertices to reflect how an attacker can progress from one phase of an attack to another.

The general approach involves associating each graph expansion with a defined structure. To illustrate, let the expanded graph for the Initial Access phase be denoted as $G_{exp}(IA)=(V_{exp}(IA), E_{exp}(IA), V_{entry}(IA), V_{exit}(IA))$, and the graph for the Lateral Movement phase as $G_{exp}(LM)=(V_{exp}(LM), E_{exp}(LM), V_{entry}(LM), V_{exit}(LM))$. A directed edge is added from a vertex $u \in V_{exit}(IA)$ to a vertex $v \in V_{entry}(LM)$ if and only if both the nodes u and v correspond to (e.g., are derived from) the same compute node.

If the entry vertex v in the next phase corresponds to a role node, the transition requires that the relevant role r must be available within the compute node associated with the exit vertex u. This relationship is enforced through the HAS_ROLE(cn, r) fluent, ensuring that the privilege escalation or lateral movement is accurately captured by the expanded graph.

The CRIS also adds unique source and sink nodes to facilitate overall graph management and evaluation. The source node is connected to all entry nodes of the root (e.g., the very first) phase(s) in the attack chain composition digraph, and all exit nodes of the final phase are connected to the sink node. This design ensures a complete path through all phases of the attack chain, from the initial entry to the final outcome.

The edges connecting the source and sink nodes are assigned an infinite cost (e.g., a large cost), reflecting that these transitions should not factor into typical traversal or optimization decisions. Similarly, edges connecting the exit node of one phase to the entry node of the next phase are assigned an infinite cost. This assignment ensures that only legitimate, fluent-based paths are evaluated as attack vectors, while artificial transitions between phases are excluded from optimization.

In cases where micro-chains—smaller, simpler chains representing distinct actions—are involved, the design is optimized to avoid introducing edges with infinite costs. Instead, the corresponding exit and entry vertices are directly joined, similar to the approach used within the Initial Access expansion. This optimization reduces graph complexity and ensures efficient evaluation of attack paths without compromising the integrity of the graph representation.

An example 900 of FIG. 9A illustrates an expansion graph defined by an attack chain 902, where two Initial Access and Lateral Movement partial attack chains are followed by an Exfiltration phase. The graph represents how the CRIS links these partial attack chains through their respective expanded graphs, capturing the flow of the attack as it progresses across multiple paths and phases.

Each individual partial attack chain may be modeled through micro-chain expansions, which allows for efficient reuse of specific segments across phases. For example, a HAS_RCE micro expansion 904 is shared between an initial access expansion 906 and a lateral movement expansion 908 (though it is noted that its involvement in the Exfiltration phase is not depicted). These micro expansions allow the CRIS to model specific reusable attack patterns while maintaining consistency between multiple phases. The initial access expansion 906 and the lateral movement expansion 908 are further described with respect to an expansion 462 of FIG. 4B and the expansion 502 of FIG. 5A, respectively. The HAS_RCE micro expansion 904 is as described with respect to an expansion 464 of FIG. 4B. In the example 900, K is assumed to equal 7 so that nodes 910 and 912 can be connected.

The interconnections between the expansions is achieved by linking the exit vertices of one phase to the entry vertices of the subsequent phase, provided they originate from the same compute node. For example, the exit vertices of the initial access expansion 906, such as $v2_{IA1}(cn_1)$, connect to the HAS_RCE micro expansion 904 entry vertices, such as $v1_{IA2}(cn_1)$. Similarly, the exit vertices of the lateral movement expansion 908, such as $v1_{LM}(cn_1, 1)$, connect to the HAS_RCE micro expansion 904 entry vertices, such as $v1_{IA2}(cn_1)$. If the transition involves roles, the CRIS ensures that the HAS_ROLE fluent allows for the connection. To ensure these interconnections reflect meaningful transitions, the cost of such interconnecting edges is set to infinity (e.g., a large number). It is noted again that the Exfiltration part is not shown in FIG. 9A. This interconnected graph demonstrates how CRIS efficiently constructs attack chains by leveraging micro-chain expansions, ensuring consistency and reusability across phases.

FIG. 9B illustrates an example 950 of interconnecting graph expansions for partial attack chains, demonstrating how the CRIS constructs a coherent attack path by linking multiple phases given by an attack chain 952. The attack chain 952 includes three sequential phases: Initial Access, Lateral Movement, and Exfiltration. The graph visually represents the CRIS process of connecting these phases through their respective expanded graphs, modeling the flow of the attack as it evolves across compute nodes and roles within the environment.

In this example, the expansions for individual partial attack chains are constructed with respect to the fluent database. As described above, each phase is modeled through micro-chain expansions, which are interconnected to form a complete attack path. The CRIS establishes these interconnections as shown with the dashed arrows, indicating that exit nodes from one phase connect to entry nodes in the subsequent phase. Importantly, such connections are valid only when the connected nodes originate from the same compute node, ensuring consistency in the attack progression.

The diagram includes an expansion 954 for the Initial Access phase (e.g., the first section of the graph, with nodes such as $v1_{IA}(cn_1)$, $v2_{IA}(cn_1)$, and $v3_{IA}(cn_1)$). The expansion 954 is as described with respect to FIG. 5A; an expansion 956 for the Lateral Movement phase (depicted in the central portion and includes nodes like $v1_{LM}$(cn1, 1) and $v1_{LM}(cn_2, 1)$), and which is as described with respect to FIG. 5A; and an expansion 958 for the Exfiltration phase (represented by nodes like $v1_{EX}(cn_1)$ and $v2_{EX}(cn_1)$), and which is as described with respect to FIG. 7.

The interconnections between these phases are shown via dashed lines, linking the relevant exit and entry nodes from each partial attack chain. For example, exit nodes from the Initial Access phase (i.e., the expansion 954), such as $v2_{IA}(cn_1)$, connect to entry nodes in the Lateral Movement phase (i.e., the expansion 956), such as $v1_{LM}(cn_1,1)$, if they both correspond to the same compute node. Similarly, nodes from the Exfiltration phase (e.g., the expansion 958) connect to exit nodes in the expansion 956. In the example 950, K is assumed to equal 7 so that nodes 964, 966, and 968 can be connected.

The CRIS introduces a source node 960 and a sink node 962 in this expansion. The source node 960 connects to the entry nodes of the Initial Access phase (i.e., the expansion 954), ensuring that the attack chain begins cohesively. The sink node 962, in turn, links to the exit nodes of the Exfiltration phase (i.e., the expansion 958), signifying the potential culmination of the attack. The costs of edges connecting the source node 960 and the sink node 962 to the rest of the graph, as well as interconnections between phases, are set to infinity (or a large number), ensuring that only meaningful transitions are considered in the attack model.

This interconnected graph demonstrates how CRIS effectively constructs multi-phase attack chains by leveraging micro-chain expansions. The reuse of expansions, such as those for lateral movement or initial access, ensures consistency across phases while optimizing the modeling process. By maintaining a structured sequence of attack paths with proper interconnections, CRIS provides a clear representation of potential attack vectors, enabling efficient analysis and mitigation strategies.

Figure 10:
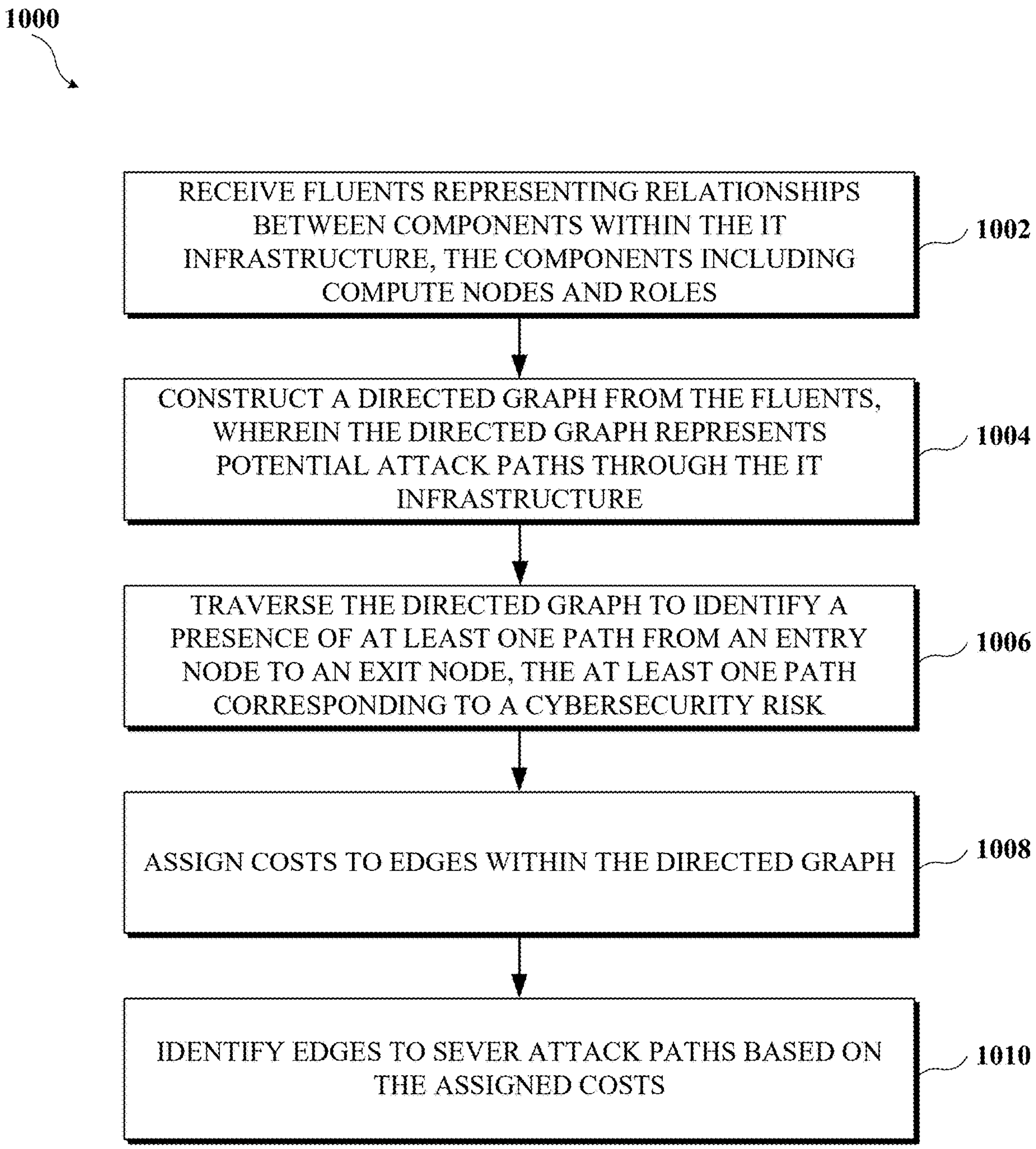
FIG. 10 is a flowchart of an example of a technique for identifying cybersecurity risks using graph expansion and fluents.

To further describe some implementations in greater detail, reference is next made to examples of techniques which may be performed by or using a system for identifying cybersecurity risks using graph expansion and fluents. FIG. 10 is a flowchart of an example of a technique 1000 for identifying cybersecurity risks using graph expansion and fluents. The technique 1000 can be implemented by a CRIS, such as the CRIS 104 of FIG. 1 or the CRIS 300 of FIG. 3 The technique 1000 can be executed using computing devices, such as the systems, hardware, and software described with respect to FIGS. 1-9B. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

At block 1002, the technique 1000 receives (e.g., accesses) fluents representing relationships between components within the IT infrastructure, including compute nodes and roles. These fluents serve as the foundation for constructing a directed graph. At block 1004, a directed graph is constructed from the fluents. In the directed graph, nodes represent components such as compute nodes and roles, and edges represent potential attack paths through the IT infrastructure.

Constructing the directed graph may include receiving an attack chain including partial attack chains; generating respective expansion graphs for the partial attack chains; and interconnecting the respective expansion graphs by linking exit vertices of an expansion graph of one partial attack chain to entry vertices of an expansion graph of an immediately succeeding partial attack chain. Interconnecting the expansion graphs may include connecting an exit vertex to an entry vertex where the exit vertex and the entry vertex are derived from a same compute node.

Constructing the directed graph may include identifying transitions between phases that involve roles associated with compute nodes; validating each transition by confirming an existence of a relationship indicating that a role is permissible or applicable within a compute node; and establishing a directed edge between an exit vertex of a preceding phase and an entry vertex of a subsequent phase, provided the relevant compute node and corresponding role relationship is validated.

At least one fluent of the fluents may be a unary fluent representing properties or permissions associated with an individual compute node. As described above, two vertices corresponding to the unary fluent may be generated. A directed edge may be created between the two vertices to represent the presence of a property or permission within the individual compute node. A traversal cost is assigned to the directed edge based on a cost associated with the unary fluent.

At least one fluent of the fluents may be a binary fluent representing a relationship between pairs of components. As described above, two nodes may be generated for the at least one fluent, one node for each component in the relationship. A directed edge may be added between the two nodes to represent the relationship defined by the binary fluent. A traversal cost may be assigned to the directed edge based on a cost associated with the binary fluent.

At block 1006, the directed graph is traversed to identify paths from entry nodes to exit nodes. Each identified path corresponds to a potential cybersecurity risk, represented as an attack chain traversing the IT infrastructure. This traversal process enables to systematically uncover possible attack vectors by following paths across interconnected nodes and roles. As mentioned above, any graph traversal technique or algorithm can be used.

At block 1008, costs are assigned to the edges within the directed graph, reflecting various factors that influence the ease or likelihood of traversal by an attacker. These factors may include permissions or access levels associated with fluents, including both unary and binary fluents. Unary fluents describe individual properties or permissions tied to specific nodes, while binary fluents represent relationships between two components.

The technique 1000 further involves interconnecting expansions of partial attack chains by linking exit vertices from one expansion to entry vertices of another when they originate from the same compute node. When transitions between roles occur, the CRIS ensures that the roles and their corresponding nodes are properly associated, based on predefined relationships between them. For instance, the graph reflects the concept that a compute node must logically permit a role to exist or transition to it, enabling meaningful role-based connections.

At block 1010, edges for mitigation are identified to sever attack paths. The edges are identified based on the assigned traversal costs. The CRIS prioritizes critical edges for mitigation, disrupting the most vulnerable attack paths and minimizing cybersecurity risks within the IT infrastructure.

In some implementations, the directed graph is visualized on a user interface, offering users an intuitive depiction of the infrastructure and its potential vulnerabilities. This visualization may include a list of critical fluents that correspond to attack paths, helping users identify specific points for mitigation. Furthermore, CRIS may generate alerts when critical attack paths are identified, ensuring that administrators can respond promptly to emerging risks.

Figure 11:
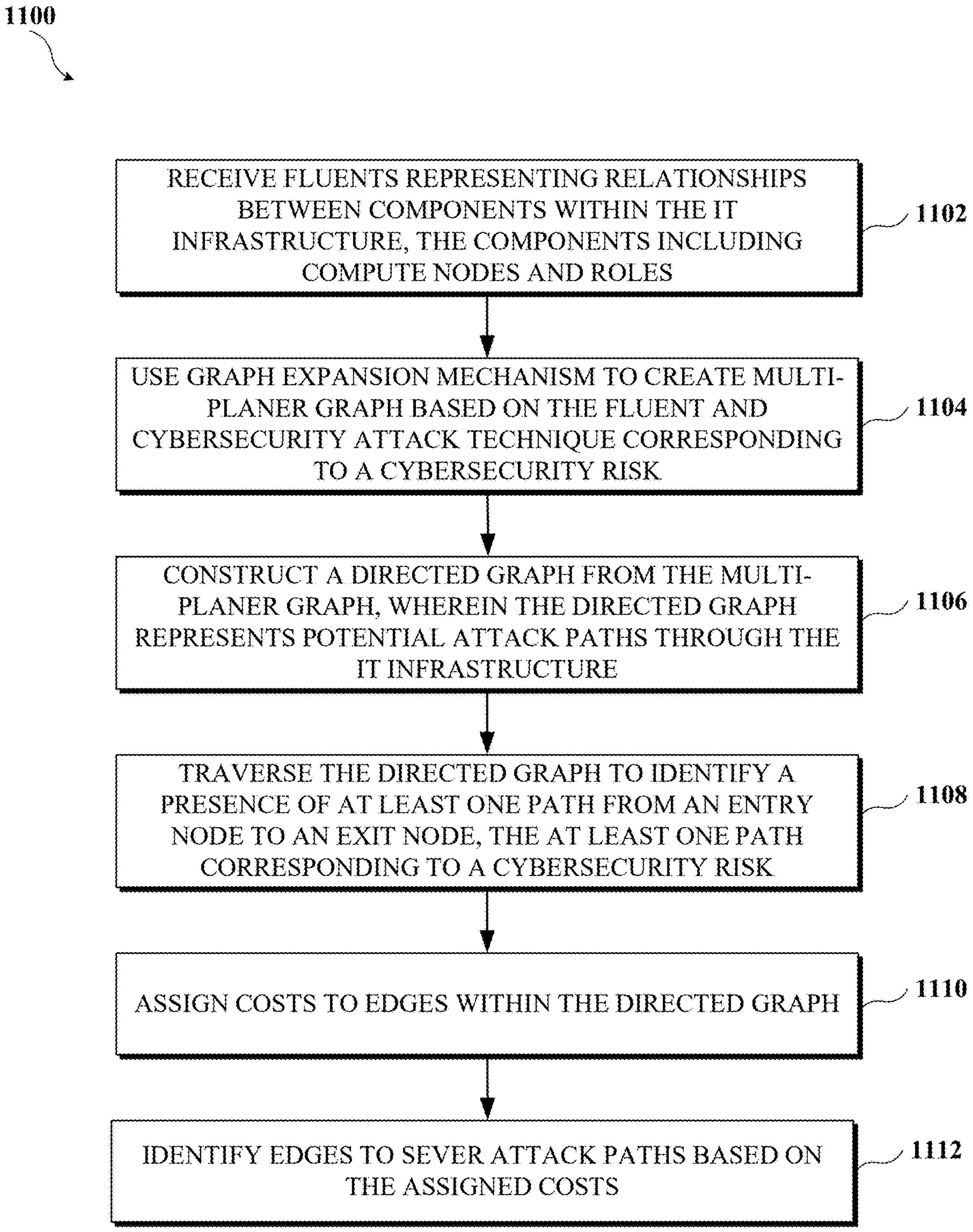
FIG. 11 is a flowchart of another example of a technique for identifying cybersecurity risks using graph expansion and fluents.

FIG. 11 is a flowchart of another example of a technique 1100 for identifying cybersecurity risks using graph expansion and fluents. The technique 1100 can be implemented by a CRIS, such as the CRIS 104 of FIG. 1 or the CRIS 300 of FIG. 3 The technique 1100 can be executed using computing devices, such as the systems, hardware, and software described with respect to FIGS. 1-9B. The technique 1100 can be performed, for example, by executing a machine-readable program or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof. The technique 1100 generates a multi-planar directed graph representing potential cybersecurity risks in an IT infrastructure by incorporating a graph expansion mechanism.

At block 1102, the technique 1100 receives fluents that define relationships between components, including compute nodes and roles, within the IT infrastructure. These fluents provide a foundational dataset for modeling potential attack paths. At block 1104, the technique 1100 utilizes a graph expansion mechanism to create a multi-planar graph based on the received fluents and mapped to specific cybersecurity tactics, such as those identified in the MITRE ATT&CK framework. This expansion process may involve generating micro-chains or partial attack chains that can be connected within the larger graph to depict complex, multi-phase attack sequences. For example, separate expansions may represent individual tactics within an attack, such as initial access or lateral movement, and these expansions are later interconnected to form comprehensive attack chains.

At block 1106, a directed graph is constructed from the multi-planner graph. The directed graph represents potential attack paths through the IT infrastructure. That is, the multi-planar graph is refined by constructing a directed graph that translates the expanded graph components into a format that represents potential attack paths. Nodes within the directed graph correspond to compute nodes and roles, while edges illustrate possible transitions between them.

At block 1108, the directed graph is traversed to identify paths between entry and exit nodes. Each path indicates a potential cybersecurity risk. This traversal enables the detection of critical paths that may represent real-world attack vectors within the IT infrastructure. At block 1110, costs are assigned to each edge within the directed graph. Assigning the costs can be as described, such as with respect to the block 1008 of FIG. 10. At block 1112, edges for mitigation are identified to sever attack paths. The edges are identified based on the assigned traversal costs. The CRIS prioritizes critical edges for mitigation, disrupting the most vulnerable attack paths and minimizing cybersecurity risks within the IT infrastructure.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method implemented by a cybersecurity risk identification software for identifying cybersecurity risks in an information technology (IT) infrastructure, comprising:

receiving fluents representing relationships between components within the IT infrastructure, the components including compute nodes and roles;

constructing a directed graph from the fluents, wherein the directed graph represents potential attack paths through the IT infrastructure, wherein constructing the directed graph from the fluents comprises:

receiving an attack chain including partial attack chains;

generating respective expansion graphs for the partial attack chains; and interconnecting the respective expansion graphs by linking exit vertices of an expansion graph of one partial attack chain to entry vertices of an expansion graph of an immediately succeeding partial attack chain;

traversing the directed graph to identify a presence of at least one path from an entry node to an exit node, the at least one path corresponding to a cybersecurity risk;

assigning costs to edges within the directed graph; and identifying edges to sever attack paths based on the assigned costs.

2. The method of claim 1, wherein interconnecting the expansion graphs comprises:

connecting an exit vertex to an entry vertex where the exit vertex and the entry vertex are derived from a same compute node.

3. The method of claim 1, wherein interconnecting the expansion graphs comprises:

identifying transitions between phases that involve roles associated with compute nodes;

validating each transition by confirming an existence of a relationship indicating that a role is permissible or applicable within a compute node; and establishing a directed edge between an exit vertex of a preceding phase and an entry vertex of a subsequent phase, provided a relevant compute node and corresponding role relationship is validated.

4. The method of claim 1, wherein at least one fluent of the fluents is a unary fluent representing properties or permissions associated with an individual compute node, further comprising:

generating two vertices corresponding to the unary fluent;

creating a directed edge between the two vertices to represent the presence of a property or permission within the individual compute node; and assigning a traversal cost to the directed edge based on a cost associated with the unary fluent.

5. The method of claim 1, wherein at least one fluent of the fluents is a binary fluent representing a relationship between pairs of components, further comprising:

generating two nodes for the at least one fluent, one node for each component in the relationship;

adding a directed edge between the two nodes to represent the relationship defined by the binary fluent; and assigning a traversal cost to the directed edge based on a cost associated with the binary fluent.

6. The method of claim 1, wherein the fluents include network connectivity relationships between compute nodes and access permissions for roles associated with compute nodes.

7. A device for identifying cybersecurity risks in an information technology (IT) infrastructure, comprising:

a memory subsystem; and processing circuitry, the processing circuitry configured to execute instructions stored in the memory subsystem to:

receive fluents representing relationships between components within the IT infrastructure, the components including compute nodes and roles;

construct a directed graph from the fluents, wherein the directed graph represents potential attack paths through the IT infrastructure, wherein to construct the directed graph from the fluents comprises to:

receive an attack chain including partial attack chains;

generate respective expansion graphs for the partial attack chains; and interconnect the respective expansion graphs by linking exit vertices of an expansion graph of one partial attack chain to entry vertices of an expansion graph of an immediately succeeding partial attack chain;

traverse the directed graph to identify a presence of at least one path from an entry node to an exit node, the at least one path corresponding to a cybersecurity risk;

assign costs to edges within the directed graph; and identify edges to sever attack paths based on the assigned costs.

8. The device of claim 7, wherein to interconnect the expansion graphs comprises to:

connect an exit vertex to an entry vertex where the exit vertex and the entry vertex are derived from a same compute node.

9. The device of claim 7, wherein to interconnect the expansion graphs comprises to:

identify transitions between phases that involve roles associated with compute nodes;

validate each transition by confirming an existence of a HAS_ROLE fluent between a relevant compute node and a corresponding role; and establish a directed edge between an exit vertex of a preceding phase and an entry vertex of a subsequent phase, provided the relevant compute node and corresponding role relationship is validated through the HAS_ROLE fluent.

10. The device of claim 7, wherein at least one fluent of the fluents is a unary fluent representing properties or permissions associated with an individual compute node, the processing circuitry further configured to execute instructions stored in the memory subsystem to:

generate two vertices corresponding to the unary fluent;

create a directed edge between the two vertices to represent the presence of a property or permission within the individual compute node; and assign a traversal cost to the directed edge based on a cost associated with the unary fluent.

11. The device of claim 7, wherein at least one fluent of the fluents is a binary fluent representing a relationship between pairs of components, the processing circuitry further configured to execute instructions stored in the memory subsystem to:

generate two nodes for the at least one fluent, one node for each component in the relationship;

add a directed edge between the two nodes to represent the relationship defined by the binary fluent; and assign a traversal cost to the directed edge based on a cost associated with the binary fluent.

12. The device of claim 7, wherein the fluents include network connectivity relationships between compute nodes and access permissions for roles associated with compute nodes.

13. Non-transitory computer readable media storing instructions operable to cause processing circuitry of a device to identify cybersecurity risks in an information technology (IT) infrastructure by operations, comprising:

receiving fluents representing relationships between components within the IT infrastructure, the components including compute nodes and roles;

constructing a directed graph from the fluents, wherein the directed graph represents potential attack paths through the IT infrastructure, wherein constructing the directed graph from the fluents comprises:

receiving an attack chain including partial attack chains;

generating respective expansion graphs for the partial attack chains; and interconnecting the respective expansion graphs by linking exit vertices of an expansion graph of one partial attack chain to entry vertices of an expansion graph of an immediately succeeding partial attack chain;

traversing the directed graph to identify a presence of at least one path from an entry node to an exit node, the at least one path corresponding to a cybersecurity risk;

assigning costs to edges within the directed graph; and identifying edges to sever attack paths based on the assigned costs.

14. The non-transitory computer readable media of claim 13, wherein interconnecting the expansion graphs comprises:

connecting an exit vertex to an entry vertex where the exit vertex and the entry vertex are derived from a same compute node.

15. The non-transitory computer readable media of claim 13, wherein interconnecting the expansion graphs comprises:

identifying transitions between phases that involve roles associated with compute nodes;

validating each transition by confirming an existence of a relationship indicating that a role is permissible or applicable within a compute node; and establishing a directed edge between an exit vertex of a preceding phase and an entry vertex of a subsequent phase, provided a relevant compute node and corresponding role relationship is validated.

16. The non-transitory computer readable media of claim 13, wherein at least one fluent of the fluents is a unary fluent representing properties or permissions associated with an individual compute node, the operations further comprising:

generating two vertices corresponding to the unary fluent;

creating a directed edge between the two vertices to represent the presence of a property or permission within the individual compute node; and assigning a traversal cost to the directed edge based on a cost associated with the unary fluent.

17. The non-transitory computer readable media of claim 13, wherein at least one fluent of the fluents is a binary fluent representing a relationship between pairs of components, the operations further comprising:

generating two nodes for the at least one fluent, one node for each component in the relationship;

adding a directed edge between the two nodes to represent the relationship defined by the binary fluent; and assigning a traversal cost to the directed edge based on a cost associated with the binary fluent.

18. The method of claim 1, further comprising:

receiving a costs table associating a respective cost with each of a plurality of fluent types, wherein assigning costs to edges within the directed graph comprises assigning a cost to each edge based on the cost associated with the fluent type corresponding to the edge.

19. The method of claim 1, wherein identifying edges to sever attack paths based on the assigned costs comprise:

applying a minimum cut algorithm to the directed graph to identify a minimum cost set of edges whose removal eliminates all paths from the entry node to the exit node.

20. The method of claim 1, wherein at least some of the fluents are received from at least one of a configuration management database or a probe tool that probes the components of the IT infrastructure.

* * * * *